(12) United States Patent
Lee et al.

(10) Patent No.: US 12,045,009 B2
(45) Date of Patent: Jul. 23, 2024

(54) DIGITAL HOLOGRAPHY MICROSCOPE (DHM), AND INSPECTION METHOD AND SEMICONDUCTOR MANUFACTURING METHOD USING THE DHM

(71) Applicant: Samsung Electronics Co., Ltd., Suwon-si (KR)

(72) Inventors: Myungjun Lee, Seongnam-si (KR); Wookrae Kim, Suwon-si (KR); Gwangsik Park, Suwon-si (KR); Changhoon Choi, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 307 days.

(21) Appl. No.: 17/716,257

(22) Filed: Apr. 8, 2022

(65) Prior Publication Data

US 2022/0276607 A1    Sep. 1, 2022

Related U.S. Application Data

(63) Continuation of application No. 16/225,638, filed on Dec. 19, 2018, now Pat. No. 11,314,205.

(30) Foreign Application Priority Data

Jun. 4, 2018    (KR) ........................ 10-2018-0064484

(51) Int. Cl.
*G03H 1/04*    (2006.01)
*G02B 21/36*    (2006.01)
*G03H 1/00*    (2006.01)

(52) U.S. Cl.
CPC ......... *G03H 1/0443* (2013.01); *G02B 21/361* (2013.01); *G03H 1/0465* (2013.01);
(Continued)

(58) Field of Classification Search
CPC .. G02B 21/361; G03H 1/0443; G03H 1/0465; G03H 2001/005; G03H 2001/0469
(Continued)

(56) References Cited

U.S. PATENT DOCUMENTS

| 4,955,974 A | 9/1990 | Rhodes et al. |
| 6,411,406 B1 | 6/2002 | Kreuzer |

(Continued)

FOREIGN PATENT DOCUMENTS

| CN | 102519976 A | 6/2012 |
| CN | 103328921 A | 9/2013 |

(Continued)

OTHER PUBLICATIONS

Lee et al., "Field-portable reflection and transmission microscopy based on lensless holography," Biomedical Optics Express, vol. 2, No. 9, Sep. 1, 2011, pp. 2721-2730.

(Continued)

*Primary Examiner* — Joseph P Martinez
*Assistant Examiner* — Grant A Gagnon
(74) *Attorney, Agent, or Firm* — Muir Patent Law, PLLC

(57) ABSTRACT

A low-cost digital holography microscope (DHM) that is capable of performing inspection at high speed while accurately inspecting an inspection object at high resolution, an inspection method using the DHM, and a method of manufacturing a semiconductor device by using the DHM are provided. The DHM includes: a light source configured to generate and output light; a beam splitter configured to cause the light to be incident on an inspection object and output reflected light from the inspection object; and a detector configured to detect the reflected light, wherein, when the reflected light includes interference light, the detector generates a hologram of the interference light, and wherein no lens is present in a path from the light source to the detector.

11 Claims, 19 Drawing Sheets

(52) U.S. Cl.
CPC .................. *G03H 2001/005* (2013.01); *G03H 2001/0469* (2013.01)

(58) Field of Classification Search
USPC ............................................................ 359/9
See application file for complete search history.

(56) References Cited

U.S. PATENT DOCUMENTS

| | | |
|---|---|---|
| 7,486,406 B2 | 2/2009 | Kim |
| 7,496,406 B1 | 2/2009 | Segel et al. |
| 7,948,632 B2 | 5/2011 | Gustafsson et al. |
| 8,194,124 B2 | 6/2012 | Asundi et al. |
| 8,363,316 B2 | 1/2013 | Asundi et al. |
| 9,581,967 B1 | 2/2017 | Krause |
| 9,632,299 B2 | 4/2017 | Sun et al. |
| 10,451,402 B2 | 10/2019 | Yaqoob et al. |
| 2015/0268628 A1 | 9/2015 | Sato |

FOREIGN PATENT DOCUMENTS

| | | |
|---|---|---|
| CN | 104634793 A | 5/2015 |
| CN | 106292238 A | 1/2017 |
| CN | 107356196 A | 11/2017 |
| KR | 100798085 B1 | 1/2008 |
| KR | 101428741 B1 | 8/2014 |

OTHER PUBLICATIONS

First Office Action dated Nov. 9, 2023 for corresponding CN Patent Application No. 201910128810.8.

DIGITAL HOLOGRAPHY MICROSCOPE (DHM), AND INSPECTION METHOD AND SEMICONDUCTOR MANUFACTURING METHOD USING THE DHM

CROSS-REFERENCE TO RELATED APPLICATION

This application is a Divisional Application of U.S. patent application Ser. No. 16/225,638, filed Dec. 19, 2018, which claims the benefit of Korean Patent Application No. 10-2018-0064484, filed on Jun. 4, 2018, in the Korean Intellectual Property Office, the disclosure of which is incorporated herein in its entirety by reference.

BACKGROUND

The inventive concept relates to an inspection apparatus and an inspection method, and more particularly, to an inspection apparatus and an inspection method for accurately checking the presence or absence of defects on an object to be inspected.

An electron microscope, ellipsometry, or the like has been used to check the presence or absence of defects on an object to be inspected, for example, a wafer. Among them, the electron microscope is an apparatus which makes an enlarged image of an object by using an electron beam and an electron lens. The electron microscope may overcome the resolution limit of conventional optical microscopes and may perform microscopic observation, and thus is widely used for wafer inspection. Ellipsometry may calculate information about a sample by analyzing a polarization change of reflected light reflected from the sample (e.g., a wafer surface). For example, when light is reflected from a sample, the polarization state of reflected light changes depending on optical properties of a sample material and the thickness of a sample layer. Ellipsometry may derive physical information about the sample by measuring such polarization changes.

SUMMARY

The inventive concept provides a low-cost digital holography microscope (DHM) that is capable of performing inspection at high speed while accurately inspecting an object at high resolution, an inspection method using the DHM, and a method of manufacturing a semiconductor device by using the DHM.

According to an aspect of the inventive concept, there is provided a digital holography microscope (DHM) including: a light source configured to generate and output light; a beam splitter configured to cause the light to be incident on an inspection object and output reflected light from the inspection object; and a detector configured to detect the reflected light, wherein the detector generates a hologram when the reflected light includes interference light, and wherein the DHM has a lens-free path from the light source to the detector.

According to another aspect of the inventive concept, there is provided a digital holography microscope (DHM) including: a light source configured to generate and output light; a detector configured to detect reflected light produced when the light is vertically incident on an upper surface of an inspection object or incident at a set inclination angle; and an analysis and determination unit configured to analyze the reflected light to determine whether a defect is present in the inspection object, wherein the detector generates a hologram when the reflected light includes interference light and the analysis and determination unit analyzes the hologram, and wherein the DHM has a lens-free path from the light source to the detector.

According to another aspect of the inventive concept, there is provided an inspection method using a digital holography microscope (DHM) comprising a light source and a detector, the inspection method including: generating light and making the light incident on an inspection object; detecting reflected light from the inspection object; analyzing the reflected light to determine whether a defect is present in the inspection object; and generating a hologram and analyzing the hologram when the reflected light includes interference light, wherein the DHM has a lens-free path from the light source to the detector.

According to another aspect of the inventive concept, there is provided a method of manufacturing a semiconductor device by using a digital holography microscope (DHM) comprising a light source and a detector, the method including: generating light and making the light incident on an inspection object; detecting reflected light from the inspection object; analyzing the reflected light to determine whether a defect is present in the inspection object; generating a hologram and analyzing the hologram when the reflected light includes interference light; and performing a semiconductor process on the inspection object when no defect is present in the inspection object, wherein the DHM has a lens-free path from the light source to the detector.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1A:
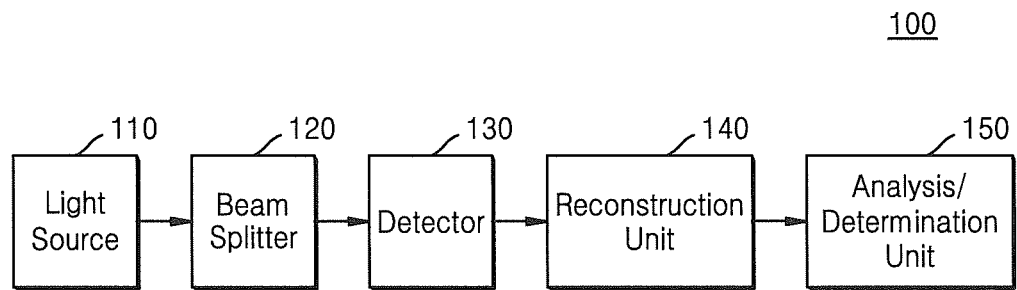
FIG. 1A is a block diagram of a digital holography microscope (DHM) according to an embodiment of the inventive concept.

Hereinafter, embodiments of the inventive concept will be described in detail with reference to the accompanying drawings. Like reference numerals denote like elements in the drawings, and redundant description thereof will be omitted.

Figure 1B:
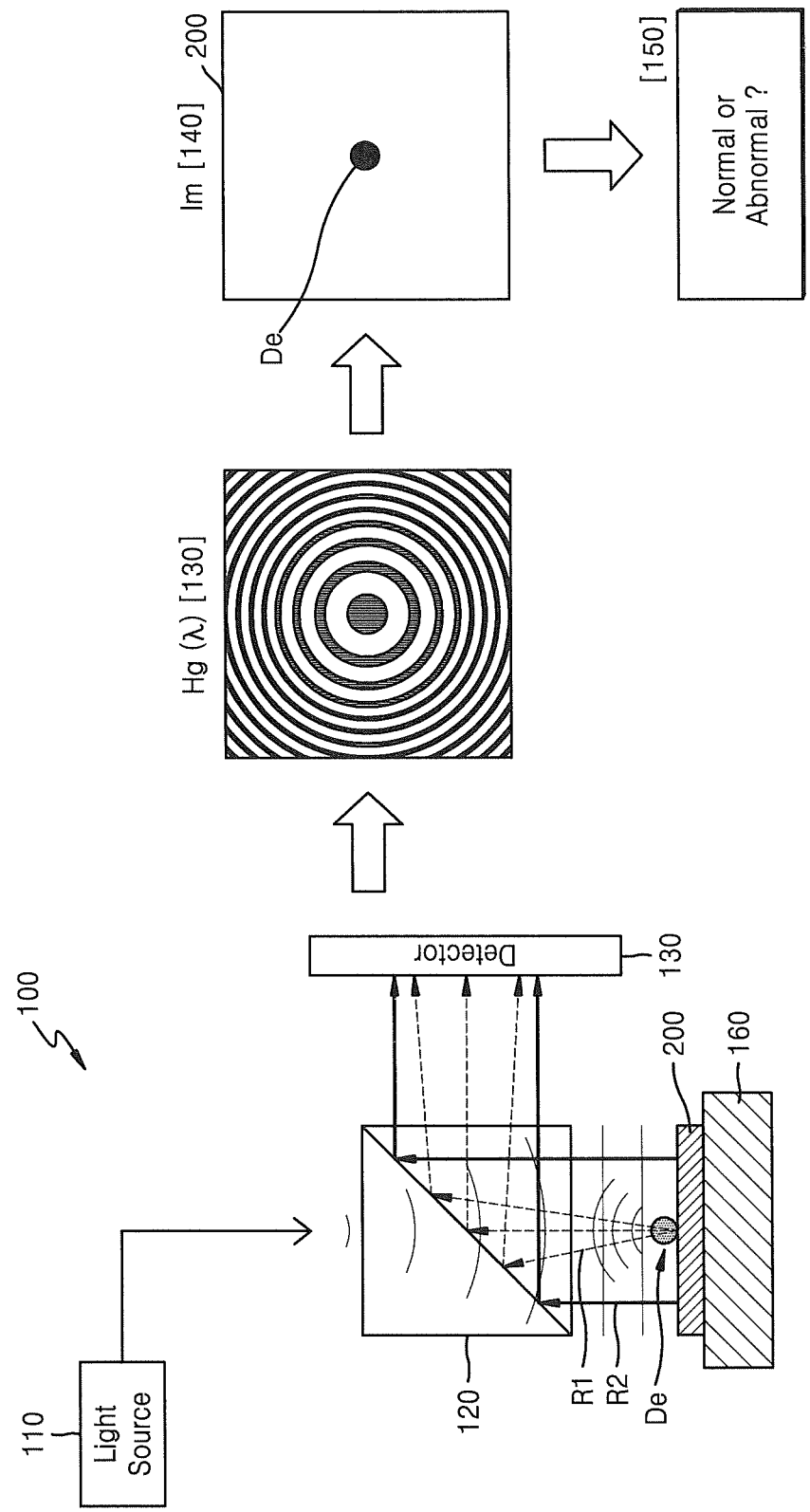
FIG. 1B is a conceptual diagram of the DHM of FIG. 1A.

FIG. 1A is a block diagram of a digital holography microscope (DHM) 100 according to an embodiment of the inventive concept, and FIG. 1B is a conceptual diagram of the DHM 100 according to embodiments of the inventive concept.

Referring to FIGS. 1A and 1B, the DHM 100 according to embodiments of the inventive concept may include a light source 110, a beam splitter 120, a detector 130, a reconstruction unit 140, and an analysis and determination unit 150.

The light source 110 may be a coherent light source that generates and outputs coherent light. Coherent light may refer to light that causes interference, such as constructive interference or destructive interference. The constructive interference indicates that two or more lights are strongly merged together when the two or more lights overlap each other, and the destructive interference indicates that two or more lights are weakly merged together when the two or more lights overlap each other. For example, the light source 110 may be a non-continuous spectral light source, such as a sodium lamp, a mercury lamp, or the like, and may be a mono-chromatic point source. In the DHM 100 according to one embodiment, the light source 110 may be, for example, a laser that generates and outputs laser light. The laser light is monochromatic light with high coherence spatially and temporally, and examples of the laser include a gas laser such as He—Ne and CO2, a solid laser such as ruby and YAG, and a semiconductor laser such as GaAs and InP.

The beam splitter 120 may make light from the light source 110 incident on an object 200 to be inspected (hereinafter, referred to as an inspection object 200) and may output reflected light reflected from the inspection object 200 toward the detector 130. The inspection object 200 may be positioned on a stage 160. The inspection object 200 may be, for example, a wafer including a plurality of semiconductor devices. However, the inspection object 200 is not limited to a wafer. For example, the inspection object 200 may be a display glass substrate. The beam splitter 120 may transmit or reflect light incident from the light source 110 and make the light incident on the inspection object 200 and may reflect or transmit reflected light from the inspection object 200 and output the reflected light toward the detector 130.

Light incident through the beam splitter 120 may be reflected by the inspection object 200. When there is a defect De in the inspection object 200, the light may be diffracted and reflected at a portion of the inspection object 200 where there is the defect De, due to the defect De. In a portion of the inspection object 200 where no defect De is present, the light may be reflected as it is without diffraction. In FIG. 1B, light diffracted and reflected at the portion where there is the defect De is indicated by a dotted arrow, and light reflected without diffraction is indicated by a solid arrow. Hereinafter, light diffracted and reflected due to the defect De is referred to as a first reflected light R1, and light reflected without diffraction is referred to as a second reflected light R2.

Light incident on the portion where there is the defect De may be diffracted by the defect De, and the diffracted light may be reflected from the inspection object 200. In addition, light reflected from the inspection object 200 may also be diffracted by the defect De. Thus, the diffraction may include both diffraction of incident light by the defect De and diffraction of reflected light by the defect De. The defect De may be fine particles on the inspection object 200, scratches formed on the inspection object 200, or the like. However, the defect De is not limited to fine particles or scratches. Generally, the defect De does not denote all particles or scratches but particles or scratches having sizes out of tolerance, and the same concept may be used below. The defect De may cause defects in the inspection object 200 in a later process for the inspection object. For example, when the inspection object 200 is a wafer, in a later semiconductor process for the wafer, the defect De may cause defects in semiconductor devices in the wafer. Accordingly, it is possible to prevent defects in the inspection object 200 or omit an unnecessary process for the inspection object by detecting the defect De in the inspection object 200 in advance through inspection and then removing the defect De or discarding the inspection object 200 itself.

The first reflected light R1 and the second reflected light R2 may overlap each other in the beam splitter 120 to cause interference. Light caused by the interference, that is, interference light may be incident on the detector 130 from the beam splitter 120. When no defect De is present in the inspection object 200, the first reflected light R1 may not be present and only the second reflected light R2 may be present. Accordingly, only the second reflected light R2 may be incident on the detector 130 through the beam splitter 120 and interference may not occur.

The detector 130 may generate a hologram for the interference light incident from the beam splitter 120. The hologram may include, for example, the intensity of the interference light and phase information on the interference light. The detector 130 may be implemented by, for example, a charge coupled device (CCD) camera or a CMOS image sensor (CIS) camera. When only the second reflected light R2 is incident on the detector 130 because no defect De is present in the inspection object 200, the detector 130 may not generate a hologram.

In general, the hologram may denote a photograph of a three-dimensional image which is stereoscopically viewed like the real thing. The hologram may be made using the principle of holography. The general principle of holography is as follows. Light emitted from a laser is split into two, one light is directly irradiated onto a screen, and the other light is reflected from an object to be viewed and reflected light is irradiated onto the screen. In this case, the light directly irradiated onto the screen is referred to as a reference beam, and the light reflected from the object is referred to as an object beam. Since the object beam is light reflected from the surface of the object, the phase of the object beam varies depending on each position on the surface of the object. Accordingly, the reference beam and the object beam may interfere with each other and an interference fringe may be formed on the screen. A film in which such interference fringes are stored is called a hologram. Typical photographs store only light intensity, but holograms may store light intensity and phase information.

The reconstruction unit 140 may digitally reconstruct a hologram from the detector 130 to generate an image of the inspection object 200. In FIG. 1B, a hologram $Hg(\lambda)$ generated by the detector 130 is shown on the right side of the detector 130, and an image Im of the inspection object 200 generated by the reconstruction unit 140 based on the hologram $Hg(\lambda)$ is shown on the right side of the hologram Hg. The intensity and phase of light in an interference fringe may vary depending on the wavelength $\lambda$ of light used for generating a hologram, and thus the shape of the interference fringe may also be changed. Thus, in general, the wavelength $\lambda$ of light used in the hologram may be described together in the hologram.

An operation of generating the image Im of the inspection object 200 by the reconstruction unit 140 may be automatically performed through a reconstruction program. For example, when information on a hologram from the detector 130 is input to the reconstruction unit 140, the image Im of the inspection object 200 may be automatically generated through a reconstruction program in the reconstruction unit 140. The reconstruction unit 140 may be implemented by a general personal computer (PC), a workstation, a super computer, or the like for executing a reconstruction program.

When the detector 130 does not generate a hologram, for example, when no defect De is present in the inspection object 200 and thus interference light is not generated and only the second reflected light R2 is incident on the detector 130 and thus the detector 130 does not generate a hologram, the reconstruction unit 140 may not generate an image of the inspection object 200. According to an embodiment of the inventive concept, the reconstruction unit 140 may generate an image of the second reflected light R2 of the detector 130 as an image of the inspection object 200.

The analysis and determination unit 150 analyzes reflected light and/or a hologram of the detector 130 or an image of the reconstruction unit 140 to determine whether there is a defect in the inspection object 200. That is, when there is a defect De in the inspection object 200, the analysis and determination unit 150 may determine that the inspection object 200 is abnormal. When no defect is present in the inspection object 200, the analysis and determination unit 150 may determine that the inspection object 200 is normal. The analysis and determination unit 150 may be implemented by, for example, a general PC, a workstation, a super computer, or the like for executing an analysis and determination program. According to an embodiment of the inventive concept, the analysis and determination unit 150 may be included in one computer device together with the reconstruction unit 140. According to an embodiment of the inventive concept, the detector 130 may also be included in a computer device together with the reconstruction unit 140 and/or the analysis and determination unit 150.

According to an embodiment of the inventive concept, the DHM may not include the reconstruction unit 140. In such a case, the analysis and determination unit 150 may analyze a hologram of the detector 130 to determine whether there is a defect in the inspection object 200. In addition, the analysis and determination unit 150 may analyze reflected light of the detector 130 to determine whether there is a defect in the inspection object 200. As described above, when no defect is present in the inspection object 200, the detector 130 may not generate a hologram. Thus, the reconstruction unit 140 may not generate an image of the inspection object 200, or may generate an image of the reflected light of the detector 130 as an image of the inspection object 200. When the reconstruction unit 140 does not generate an image of the inspection object 200, the analysis and determination unit 150 may analyze an image of the reflected light of the detector 130 to determine whether there is a defect in the inspection object 200.

In the DHM 100 according to one embodiment, there may be no lens in a path of light between the light source 110 and the detector 130. For example, the DHM 100 according to embodiments of the inventive concept may be a lens-free DHM. Accordingly, the DHM 100 according to embodiments of the inventive concept may solve all the problems that may occur in existing DHMs, and may also inspect the inspection object 200 at high speed.

More specifically, in the existing DHM, inspection is performed based on a method of generating a general hologram. That is, the existing DHM divides light output from a light source into two lights on two paths, light corresponding to the object beam is directed to a camera after passing through an inspection object or being reflected from the inspection object, and light corresponding to the reference beam is directed to the camera through another path. Thus, the existing DHM inspects the inspection object by detecting an interference phenomenon between the two lights, that is, the light corresponding to the object beam and the light corresponding to the reference beam, and reconstructing images from the interference phenomenon. The existing DHM may have some problems due to an optical system configuration thereof. For example, the light on each of the paths has to be accurately aligned for accurate interference formation, but the accurate alignment of the light is not easy due to the mechanical configuration of the existing DHM. Also, since a lens system is used, there is a trade off relationship between the resolution of the lens system and the field of view (FOV) thereof. That is, when the resolution increases, the FOV narrows and inspection speed slows down. When the resolution decreases, the FOV widens but inspection accuracy is lowered. Furthermore, the accuracy of image reconstruction may be reduced due to multiple reflections of each part, in accordance with the use of an optical system including a lens. In particular, in the case of a DHM using a high-resolution optical system, the FOV is so small that inspection time becomes very long. Thus, the DHM using a high-resolution optical system may not be used for inspection objects requiring high speed full inspection.

On the other hand, in the DHM 100 according to some embodiments, the path of the first reflected light R1 corresponding to the object beam and the path of the second reflected light R2 corresponding to the reference beam may be substantially the same. Thus, a separate optical system other than the beam splitter 120 may be unnecessary. Thus, the problem of aligning light of existing DHMs, a trade-off problem between resolution and FOV according to a lens system, and a reflection problem of each part of an optical system may be solved. In addition, since the DHM 100 according to embodiments of the inventive concept does not have a lens, the FOV is very wide and thus the inspection object 200 may be inspected at high speed.

Figure 2A:
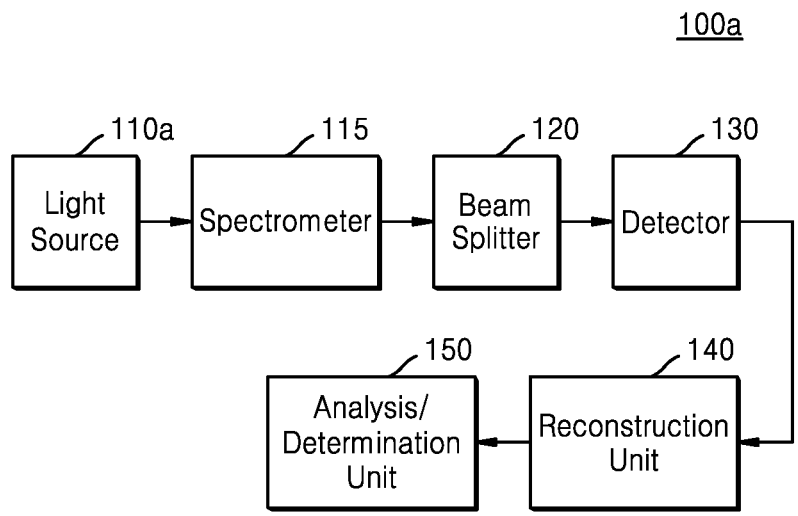
FIG. 2A is a block diagram of a DHM according to an embodiment of the inventive concept.
Figure 2B:
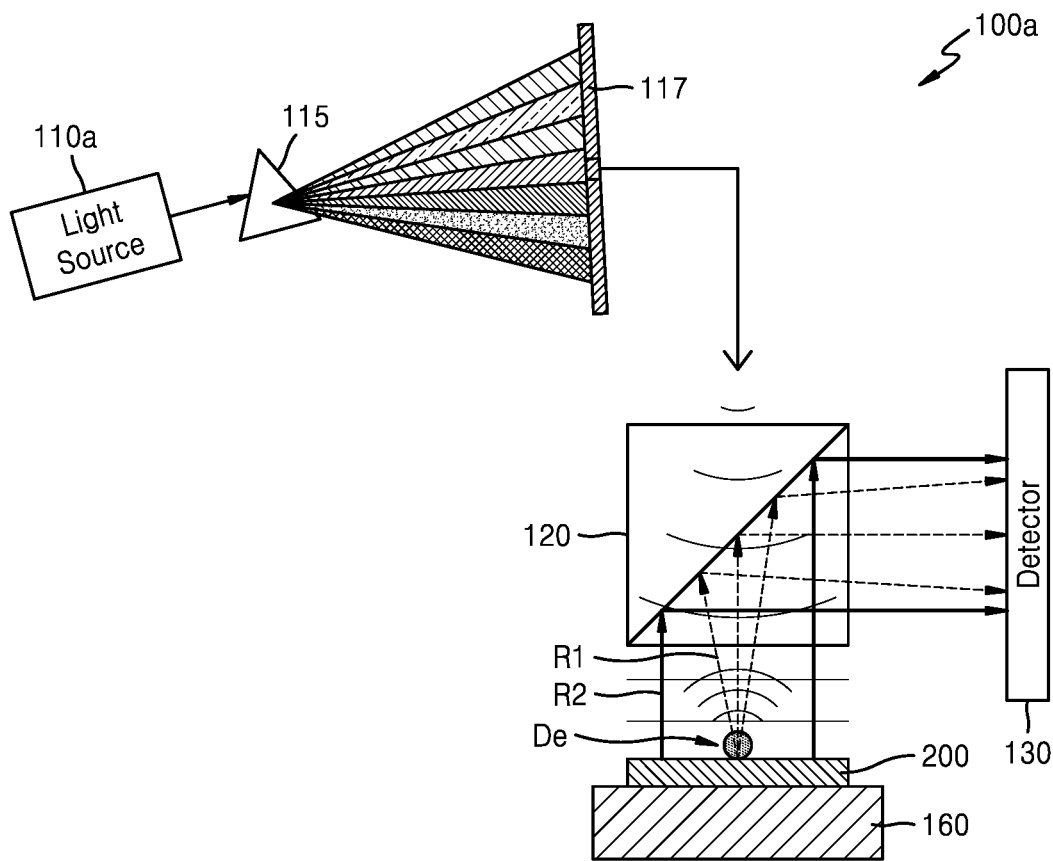
FIGS. 2B to 2D are conceptual diagrams of the DHM of FIG. 2A.
Figure 2C:
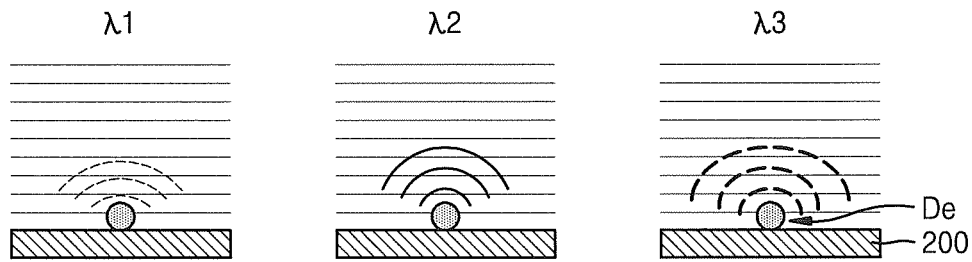
Figure 2D:
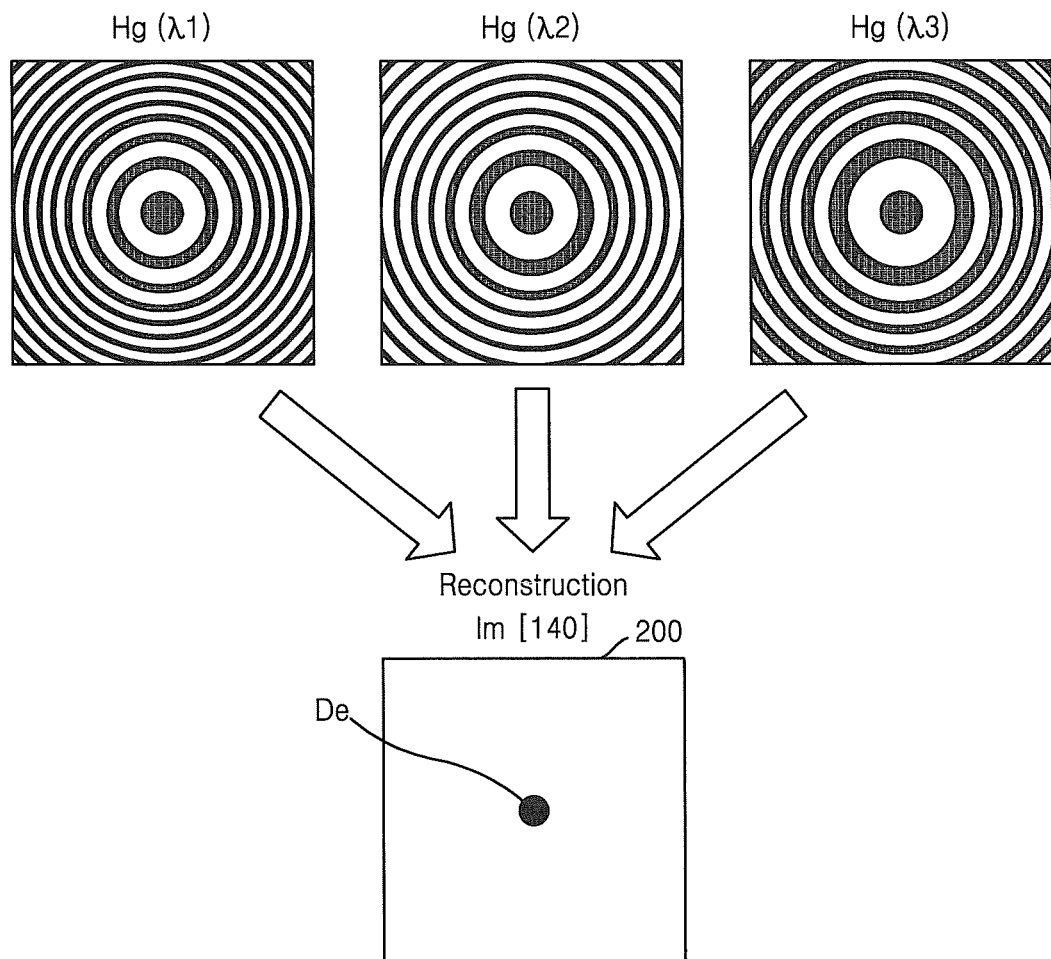

FIG. 2A is a block diagram of a DHM 100a according to an embodiment of the inventive concept, and FIGS. 2B to 2D are conceptual diagrams of the DHM 100a according to embodiments of the inventive concept. Descriptions already given with reference to FIGS. 1A and 1B will be briefly described or omitted.

Referring to FIGS. 2A to 2D, the DHM 100a according to embodiments of the inventive concept may be different from the DHM 100 of FIG. 1A in that a light source 110a is a multi-wavelength light source and there is a spectrometer 115 between the light source 110a and a beam splitter 120.

In the DHM 100a according to embodiments of the inventive concept, the light source 110a may be a multi-wavelength light source that generates and outputs multi-wavelength light. For example, the light source 110a may generate and output light in a visible light and/or ultraviolet light band. The wavelength band of the multi-wavelength light generated by the light source 110a is not limited to the above range.

The spectrometer 115 may separate multi-wavelength light from the light source 110a by wavelengths. The spectrometer 115 may be implemented, for example, through a prism or through a diffraction grating. FIG. 2B illustrates a spectrometer 115 implemented through a prism. A slit plate 117 is positioned at the front of the prism, and light having a required wavelength may be output through a slit or pin-hole formed in the slit plate 117. In addition, by moving the slit plate 117, light having a plurality of wavelengths may be output.

Depending on the wavelength of light, the shape of light (i.e., first reflected light R1) diffracted and reflected at a portion where there is a defect De of an inspection object 200 may be changed. FIG. 2C shows an example in which the shape of the first reflected light R1 varies depending on a first wavelength λ1, a second wavelength λ2, and a third wavelength λ3, which are different from each other. Also, as the shape of the first reflected light R1 varies depending on the wavelength of light, intensity and phase information in a hologram and the shape of the hologram may vary. FIG. 2D shows an example in which the shape of a generated hologram varies depending on the first wavelength λ1, the second wavelength λ2, and the third wavelength λ3.

In the DHM 100a according to embodiments of the inventive concept, the reconstruction unit 140 may digitally reconstruct a plurality of holograms corresponding to the respective wavelengths to generate images of a plurality of inspection objects 200. In addition, the reconstruction unit 140 may digitally reconstruct a plurality of holograms corresponding to the respective wavelengths to generate one composite image of the inspection object 200. The reconstruction unit 140 may combine a plurality of holograms and generate a composite image based on the combined holograms. For example, the reconstruction unit 140 may combine a plurality of holograms by averaging information of the plurality of holograms, or may combine a plurality of holograms by weighting hologram information according to wavelengths.

In the DHM 100a according to embodiments of the inventive concept, a plurality of holograms are generated by using the light source 110a, which is a multi-wavelength light source, and the spectrometer 115, and the reconstruction unit 140 generates a composite image of the inspection object 200 based on a plurality of holograms, and thus, the resolution of an image of the inspection object 200 may be greatly improved. In other words, a hologram corresponding to each wavelength and an image of the inspection object 200 corresponding to the hologram may have a somewhat lower resolution due to the absence of a lens. On the other hand, the combination of a plurality of holograms and a composite image of the inspection object 200 corresponding thereto may have a high resolution in spite of the absence of a lens.

Figure 3A:
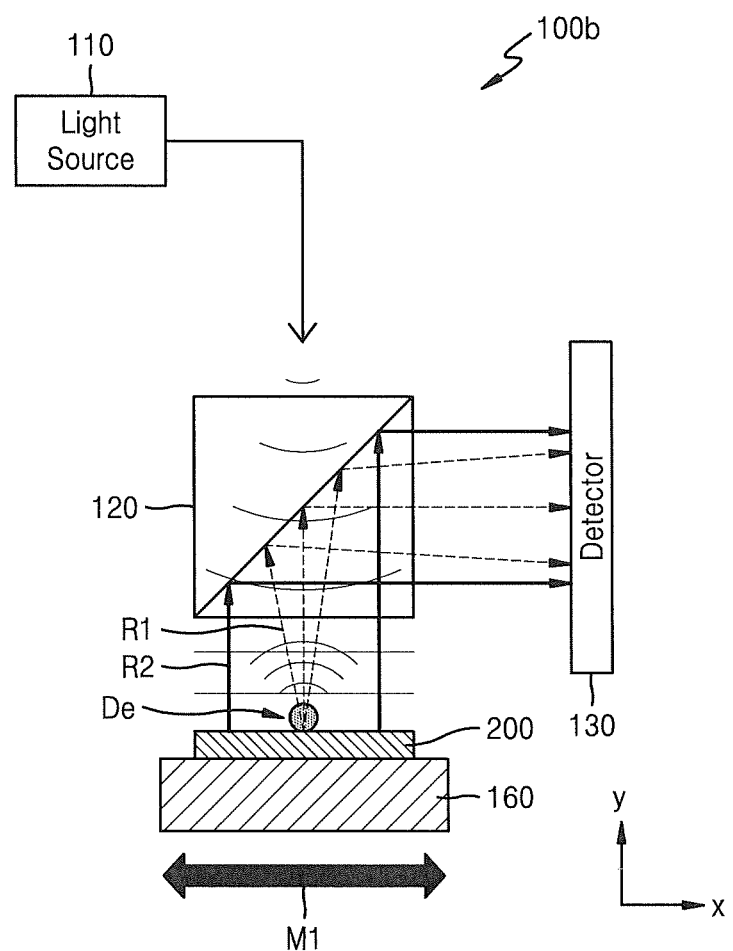
FIGS. 3A and 3B are conceptual diagrams of a DHM according to an embodiment of the inventive concept.
Figure 3B:
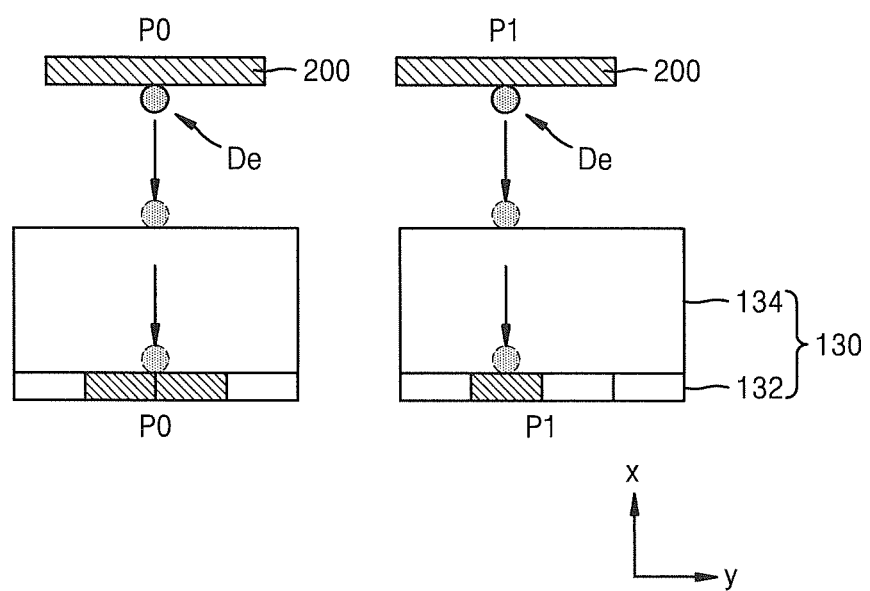

FIGS. 3A and 3B are conceptual diagrams of a DHM 100b according to an embodiment of the inventive concept. Descriptions already given with reference to FIGS. 1A to 2D will be briefly described or omitted.

Referring to FIGS. 3A and 3B, the DHM 100b according to embodiments of the inventive concept may be different from the DHM 100 of FIG. 1A in that an inspection object 200 is moved in one direction by the movement of a stage 160. Specifically, in the DHM 100b according to embodiments of the inventive concept, the stage 160 may be moved in a first direction (i.e., the x direction), as indicated by a black arrow M1, and accordingly, the inspection object 200 may be moved in the first direction (i.e., the x direction). The first direction (i.e., the x direction) may be a direction parallel to the upper surface of the inspection object 200. In the DHM 100b according to embodiments of the inventive concept, due to the movement of the inspection object 200, a detector 130 may generate a plurality of holograms and the reconstruction unit 140 may generate a composite image of the inspection object 200 based on the plurality of holograms. Accordingly, similar to the DHM 100a of FIG. 2A, the DHM 100b according to embodiments of the inventive concept may improve the resolution of an image of the inspection object 200.

For example, a first hologram may be generated by light from a light source 110 when the inspection object 200 is at a first position P0. Thereafter, the inspection object 200 may move to a second position P2 by the movement of the stage 160 in the first direction (i.e., the x direction) and a second hologram may be generated by light from the light source 110.

The principle that another hologram is formed according to the movement of the inspection object 200 may be described as follows by using the principle of the formation of a two-dimensional image. As shown in FIG. 3B, the detector 130 may include a pixel 132 in which an image corresponding to a defect De is formed, and a cover glass 134 covering the pixel 132. The position of the pixel 132 in which the image corresponding to the defect De is formed may be changed by the movement of the inspection object 200. In other words, the movement of the inspection object 200 may correspond to the movement of the detector 130 in a second direction (i.e., the y direction), and the second direction (i.e., the y direction) may be a direction parallel to a pixel surface of the detector 130.

For example, when the inspection object 200 is at the first position P0, an image corresponding to the defect De may be formed over two pixels 132, and when the inspection object 200 is at the second position P1, an image corresponding to the defect De may be foamed in one pixel 132. Accordingly, in the case of the first position P0, the intensity information of light for the defect De may be stored by two pixels 132, and in the case of the second position P1, the intensity information of light for the defect De may be stored by one pixel 132. Generally, the intensity information of light by two pixels 132 may be more accurate than the intensity information of light by one pixel 132. However, there may be an opposite case due to noise at a pixel boundary. Similar to a two-dimensional image of the defect De, the intensity and phase information of light in a hologram that is a three-dimensional image of the defect De may also be changed according to the position of the inspection object 200.

FIGS. 4 to 8 are conceptual diagrams of DHMs 100c to 100g according to embodiments of the inventive concept. Descriptions already given with reference to FIGS. 1A to 3B will be briefly described or omitted.

Figure 4:
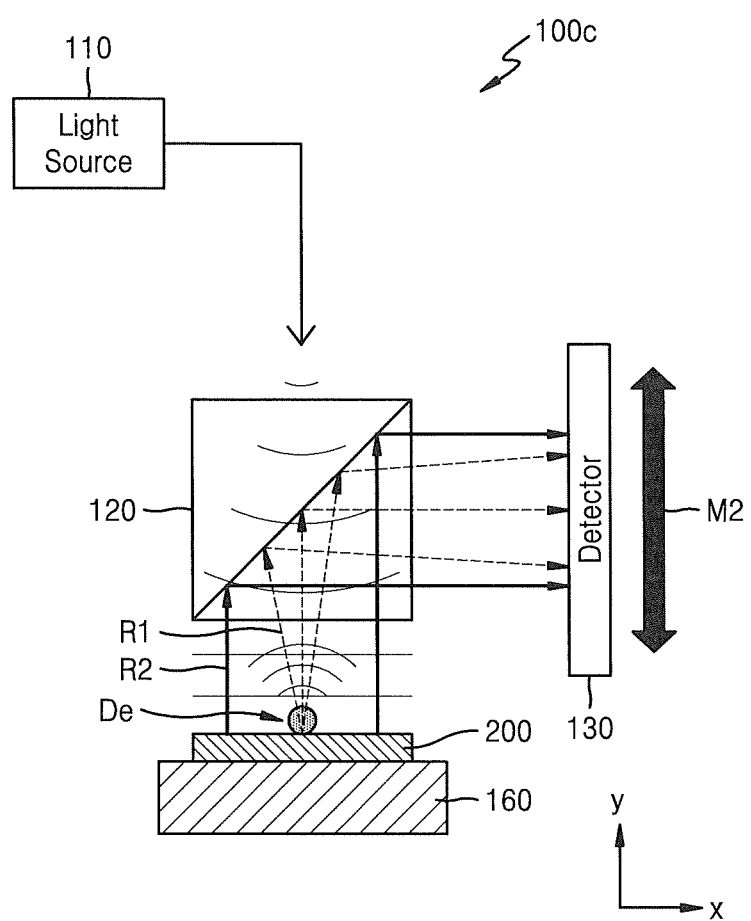
FIGS. 4 to 8 are conceptual diagrams of DHMs according to embodiments of the inventive concept.

Referring to FIG. 4, the DHM 100c may be similar, in principle, to the DHM 100b of FIG. 3A. Specifically, in the DHM 100b of FIG. 3A, the inspection object 200 moves by the movement of the stage 160. However, in the DHM 100c according to embodiments of the inventive concept, a detector 130 may move in a second direction (i.e., the y direction), as indicated by a black arrow M2. The second direction (i.e., the y direction) may be a direction parallel to the surface of a pixel in the detector 130.

Also in the DHM 100c, the detector 130 generates a plurality of holograms based on the movement of the detector 130, and accordingly a reconstruction unit 140 generates a composite image of an inspection object 200, and thus, the resolution of an image of the inspection object 200 may be improved.

Figure 5:
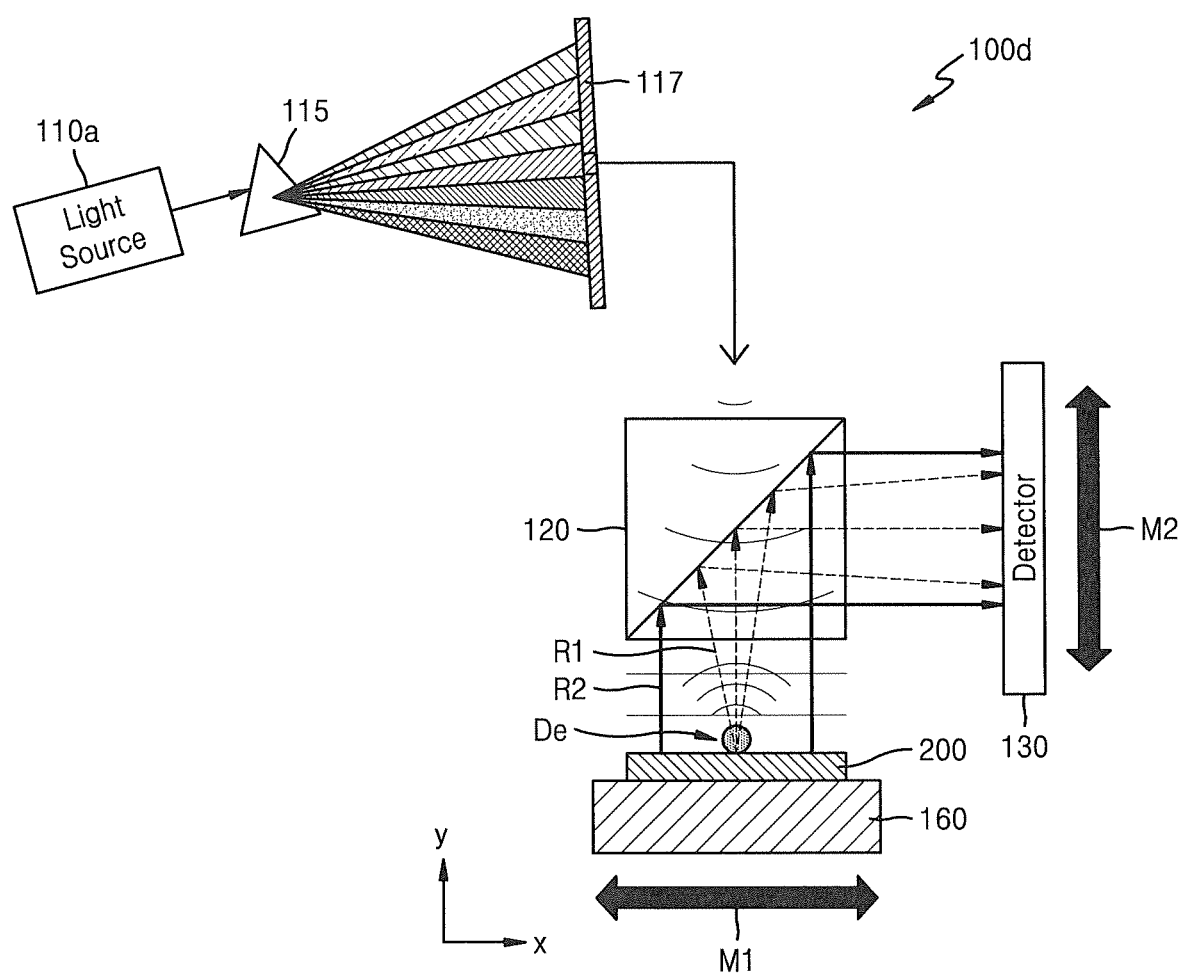

Referring to FIG. 5, the DHM 100d may be in a form obtained by combining the DHM 100a of FIG. 2A with the DHM 100b of FIG. 3A or the DHM 100c of FIG. 4A. Specifically, the DHM 100d includes a light source 110a, which is a multi-wavelength light source, and a spectrometer 115. In the DHM 100d, an inspection object 200 may move in a first direction (i.e., the x direction) by a stage 160, or a detector 130 may move in a second direction (i.e., the y direction).

In the DHM 100d, a plurality of first holograms according to wavelengths may be formed, and a plurality of second holograms may be formed by the movement of the inspection object 200 or the movement of the detector 130. A reconstruction unit 140 may generate a composite image of the inspection object 200 based on the plurality of first holograms and the plurality of second holograms. Thus, the DHM 100d may further improve the resolution of an image of the inspection object 200.

Figure 6A:
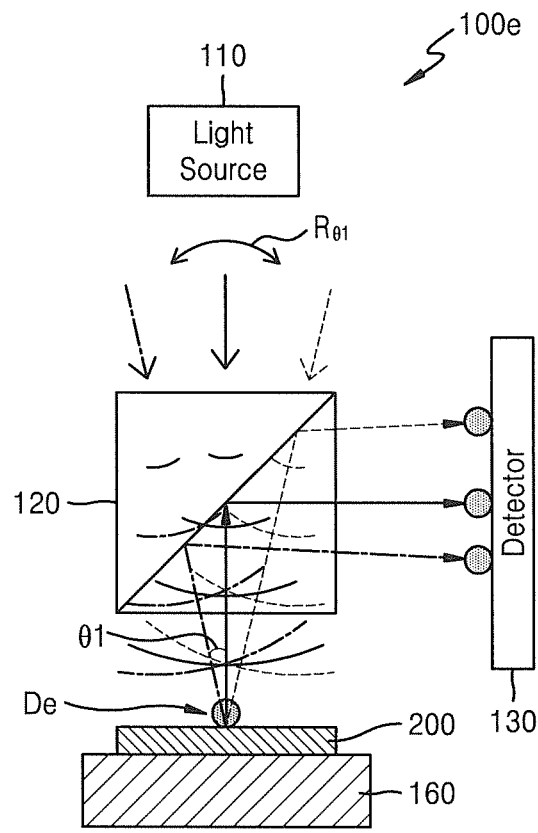
Figure 6B:
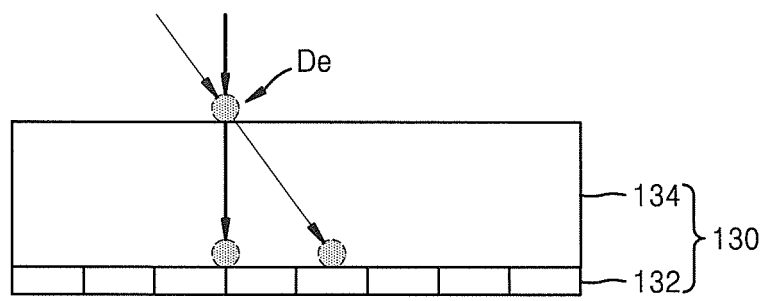

Referring to FIGS. 6A and 6B, the DHM 100e may be different from the DHM 100b of FIG. 3A or the DHM 100c of FIG. 4 in that the DHM 100e makes light from a light source 110 incident on an inspection object 200 at different angles. However, the DHM 100e may be substantially the same as the DHM 100b of FIG. 3A or the DHM 100c of FIG. 4 in terms of effects.

In the DHMs 100 and 100a to 100d of FIGS. 1A to 5, light from the light sources 110 and 110a may be vertically incident on the upper surface of the inspection object 200. On the other hand, in the DHM 100e, light from the light source 110 may be incident on the upper surface of the inspection object 200 while changing an angle in a first angle range $R_{\theta 1}$. For example, the maximum angle of the first angle range $R_{\theta 1}$ may have a first angle $\theta 1$ with respect to a normal line of the upper surface of the inspection object 200. The first angle $\theta 1$ may be 1° or less. However, the first angle $\theta 1$ is not limited thereto.

As the light from the light source 110 is incident on the upper surface of the inspection object 200 with different angles, the detector 130 may generate a plurality of holograms corresponding to incidence angles. The principle that different holograms are generated as the light from the light source 110 is incident on the upper surface of the inspection object 200 at different incidence angles may be similar to that described in the description of the DHM 100b of FIG. 3A.

Specifically, when an incidence angle of light that is incident on the upper surface of the inspection object 200 is changed, an angle at which reflected light from the inspection object 200 is incident on the detector 130 may be changed. For example, as shown in FIG. 6B, when reflected light for a defect De located at the same position is incident on the detector 130, the position of a pixel 132 in which an image of the defect De is formed may be changed according to an incidence angle of the reflected light. Thus, a case where an incidence angle of light is changed on the upper surface of the inspection object 200 has substantially the same effect as a case where the inspection object 200 moves in the DHM 100b of FIG. 3A or the detector 130 moves in the DHM 100c of FIG. 4.

FIG. 6B shows the structure of the detector 130 in an exaggerated manner. In general, the sizes of pixels in the detector 130 are fine as about 1 μm, but the thickness of a cover glass 134 may be very large as several hundreds of μm. Thus, the position of the pixel 132 in which the image of the defect De is formed may be greatly changed even with a slight change in the incidence angle of light. In consideration of this point, as described above, the first angle range $R_{\theta 1}$ of light on the upper surface of the inspection object 200 may be set very finely.

In the DHM 100e, the detector 130 may generate a plurality of holograms by changing an incidence angle of light on the upper surface of the inspection object 200, and the reconstruction unit 140 may generate a composite image of the inspection object 200 based on the plurality of holograms. Thus, the DHM 100e may improve the resolution of an image of the inspection object 200.

Figure 7:
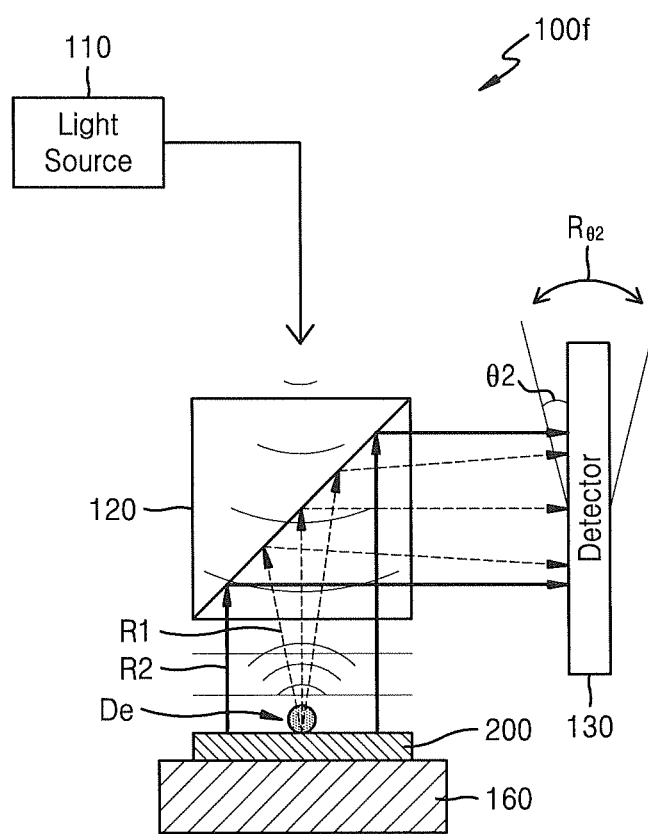

Referring to FIG. 7, the DHM 100f may be similar, in principle, to the DHM 100e of FIG. 6A. Specifically, in the DHM 100e of FIG. 6A, an angle of incidence of light of the light source 110 onto the inspection object 200 is changed. However, in the DHM 100f, a detector 130 may rotate in a second angle range $R_{\theta 2}$ such that an angle of incidence of reflected light onto a pixel surface of the detector 130 changes. For example, the maximum angle of the second angle range $R_{\theta 2}$ may have a second angle $\theta 2$ with respect to the pixel surface of the detector 130 before rotation. The second angle $\theta 2$ may also be as small as 1° or less. However, the second angle $\theta 2$ is not limited thereto. The second angle range $R_{\theta 2}$ may correspond to a change range of an incidence angle of reflected light to a normal line of the pixel surface.

The DHM 100f may have the same effect as the DHM 100e of FIG. 6A because the detector 130 in the DHM 100f rotates in the second angle range $R_{\theta 2}$ and an angle of incidence of reflected light onto the pixel surface of the detector 130 changes. Thus, the DHM 100f also may improve the resolution of an image of the inspection object 200 by generating a plurality of holograms by rotation of the detector 130 and generating a composite image of the inspection object 200.

Figure 8:
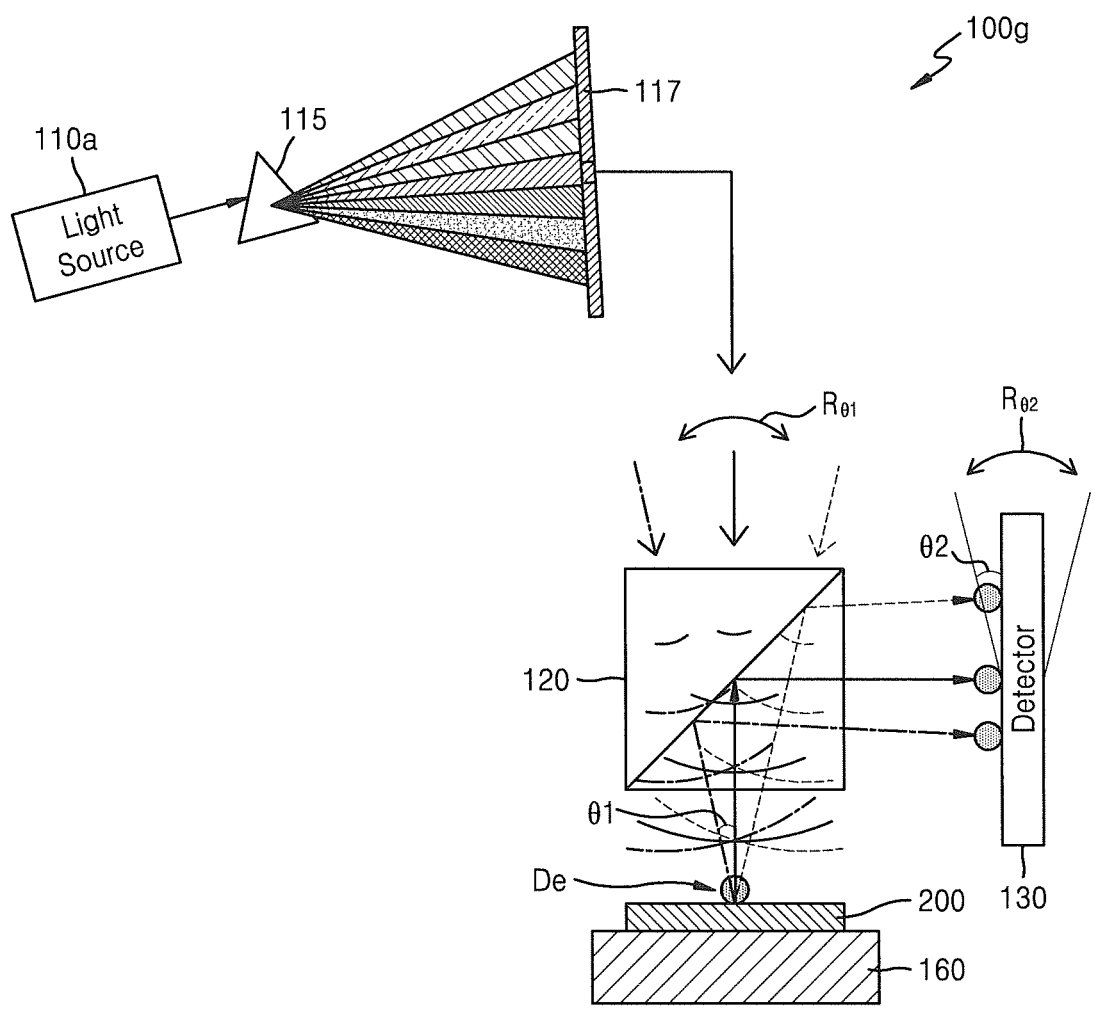

Referring to FIG. 8, the DHM 100g may be in a form obtained by combining the DHM 100a of FIG. 2A with the DHM 100e of FIG. 6A or the DHM 100f of FIG. 7. Specifically, the DHM 100g includes a light source 110a, which is a multi-wavelength light source, and a spectrometer 115. In the DHM 100g, light from the spectrometer 115 may be incident on the upper surface of an inspection object 200 while an incidence angle of the light from the spectrometer 115 is changed in a first angle range $R_{\theta 1}$, or reflected light may be incident on the detector 130 while the detector 130 is rotated in a second angle range $R_{\theta 2}$.

In the DHM 100g, a plurality of first holograms according to wavelengths may be formed, and a plurality of third holograms may be formed as an incidence angle of light from the spectrometer 115 is changed in the first angle range $R_{\theta 1}$ or the detector 130 is rotated in the second angle range $R_{\theta 2}$. A reconstruction unit 140 may generate a composite image of the inspection object 200 based on the plurality of first holograms and the plurality of third holograms. Thus, the DHM 100g may further improve the resolution of an image of the inspection object 200.

Figure 9A:
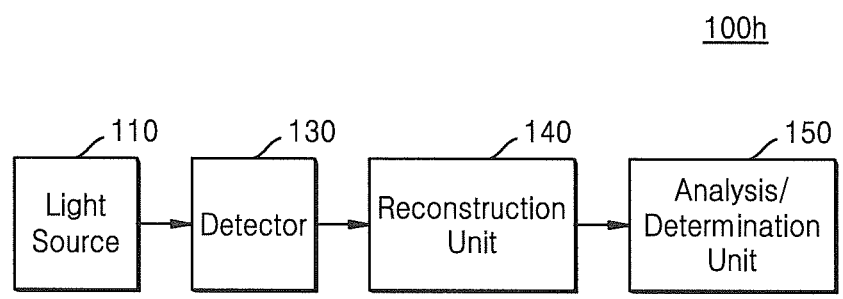
FIG. 9A is a block diagram of a DHM according to an embodiment of the inventive concept.
Figure 9B:
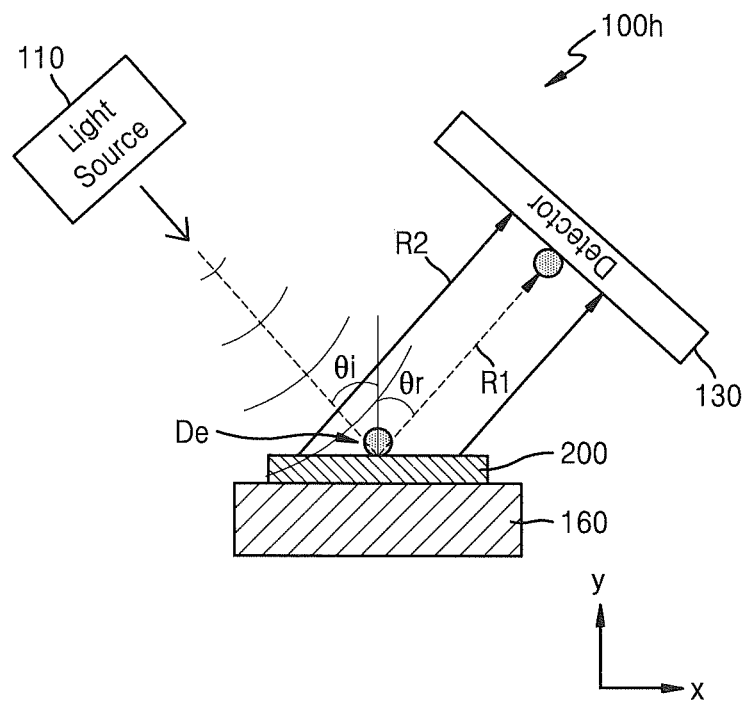
FIG. 9B is a conceptual diagram of the DHM of FIG. 9A.

FIG. 9A is a block diagram of a DHM 100h according to an embodiment of the inventive concept of the inventive concept, and FIG. 9B is a conceptual diagram of the DHM 100h according to embodiments of the inventive concept. Descriptions already given with reference to FIGS. 1A and 1B will be briefly described or omitted.

Referring to FIGS. 9A and 9B, the DHM 100h according to embodiments of the inventive concept may be structurally different from the DHMs 100 and 100a to 100g of FIGS. 1A to 8. Specifically, the DHM 100h according to embodiments of the inventive concept may include only a light source 110, a detector 130, a reconstruction unit 140, and an analysis and determination unit 150, and may not include a beam splitter.

In the DHM 100h, light from the light source 110 may be obliquely incident on an inspection object 200, as shown in FIG. 9B, in order to separate reflected light from the inspection object 200 from light incident from the light source 110 onto the inspection object 200 because no beam splitter is present. Accordingly, light from the light source 110 may be incident with a first incidence angle θi with respect to a normal line of the upper surface of the inspection object 200, and reflected light from the inspection object 200 may be reflected with a first reflection angle θr with respect to the normal line. According to Snell's law, the first reflection angle θr may be the same as the first incidence angle θi.

The detector 130 may be arranged at a position where reflected light may be detected. For example, the detector 130 may be arranged such that reflected light is incident perpendicularly to a pixel surface of the detector 130. Accordingly, the pixel surface of the detector 130 may have a certain angle with respect to a second direction (i.e., the y direction). When there is a beam splitter, the direction of reflected light may be adjusted by controlling the beam splitter, and thus, the degree of freedom of an arrangement angle of the detector 130 may increase and the detector 130 may be arranged regardless of the structure or size of the inspection object 200 or the stage 160. On the other hand, in the absence of a beam splitter, when an incidence angle of light that is incident on the inspection object 200 from the light source 110 is determined, the degree of freedom of the arrangement angle of the detector 130 may decrease because the arrangement angle of the detector 130 is determined to some extent, and the position of the detector 130 may be limited depending on the structure or size of the inspection object 200 or the stage 160. For example, as the detector 130 is placed closer to the inspection object 200, reflected light having a higher intensity may be detected. However, there may be a limit on placing the detector 130 close to the inspection object 200 according to the structures and sizes of the inspection object 200 and the stage 160.

The principle that the DHM 100h according to embodiments of the inventive concept forms a hologram is not so different from the principle that the DHM 100 of FIG. 1A forms a hologram. For example, light incident from the light source 110 onto a portion where there is a defect De may be diffracted and reflected and be incident on the detector 130 as a first reflected light R1. Light incident from the light source 110 onto a portion where no defect De is present may be reflected without diffraction and be incident on the detector 130 as a second reflected light R2. The first reflected light R1 and the second reflected light R2 may overlap each other in the detector 130 to cause interference. Light caused by the interference, that is, interference light may generate a hologram in a pixel of the detector 130. When no defect De is present in the inspection object 200, the first reflected light R1 may not be present and only the second reflected light R2 may be present. Accordingly, only the second reflected light R2 may be incident on the detector 130 and interference may not occur.

The DHM 100h according to embodiments of the inventive concept may correspond to an optics-free DHM since no beam splitter is present. Accordingly, the DHM 100h according to embodiments of the inventive concept may be realized at a low cost with a simple structure, while having substantially the same effect as the lens less DHMs according to the embodiments described above.

FIGS. 10 to 13 are conceptual diagrams of DHMs 100i to 100l according to embodiments of the inventive concept. Descriptions already given with reference to FIGS. 1 to 9B will be briefly described or omitted.

Figure 10:
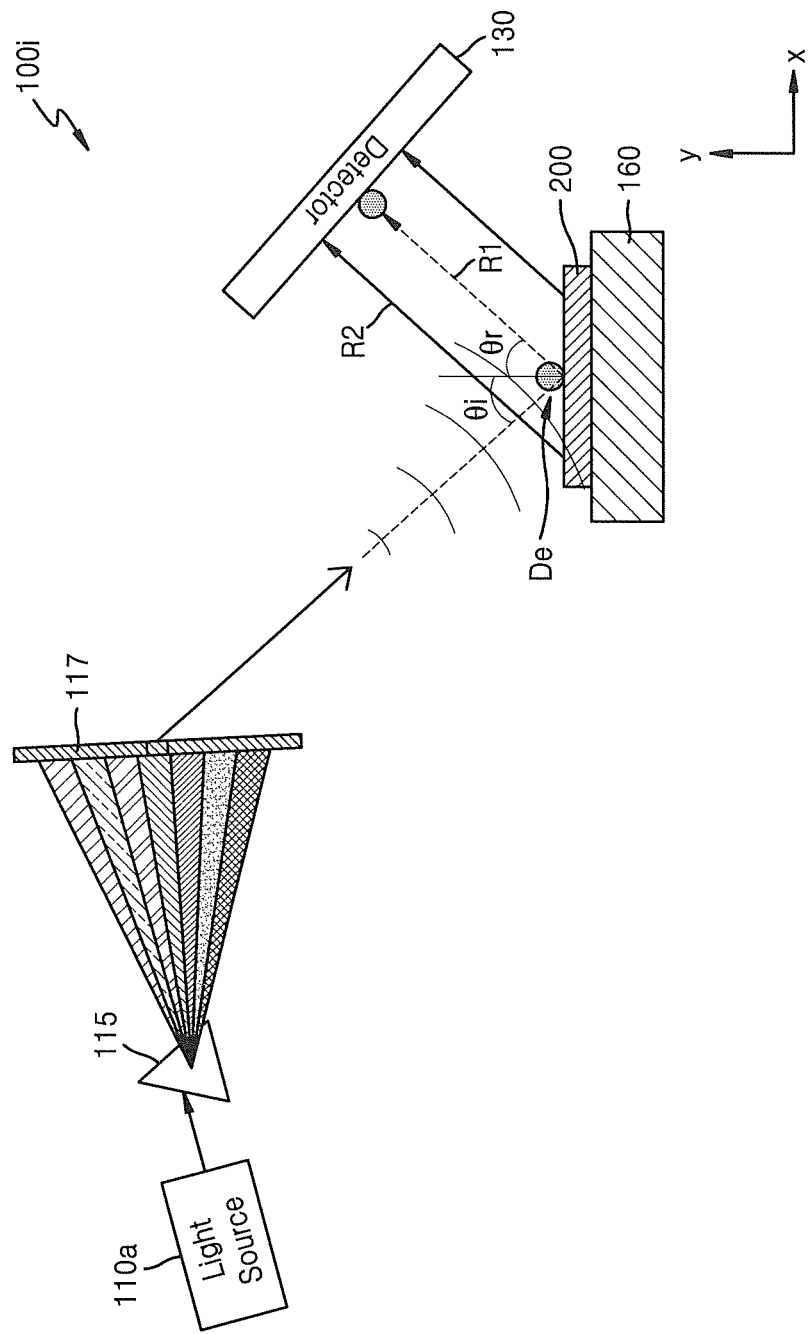
FIGS. 10 to 13 are conceptual diagrams of DHMs according to embodiments of the inventive concept.

Referring to FIG. 10, the DHM 100i may be different from the DHM 100a of FIG. 2A in that the DHM 100i does not have a beam splitter. In addition, the DHM 100i may be different from the DHM 100h of FIG. 9A in that light from a spectrometer 115 of the DHM 100i is obliquely incident on an inspection object 200. Specifically, the DHM 100i includes a light source 110a, which is a multi-wavelength light source, and the spectrometer 115, and light from the spectrometer 115 may be directly incident, with a first incidence angle θi, on the inspection object 200 without passing through a beam splitter.

In the DHM 100i, a detector 130 may form a plurality of holograms according to wavelengths, as in the DHM 100a of FIG. 2A, and a reconstruction unit 140 may generate a composite image of the inspection object 200 based on the plurality of holograms. Thus, the DHM 100i may improve the resolution of an image of the inspection object 200.

Figure 11:
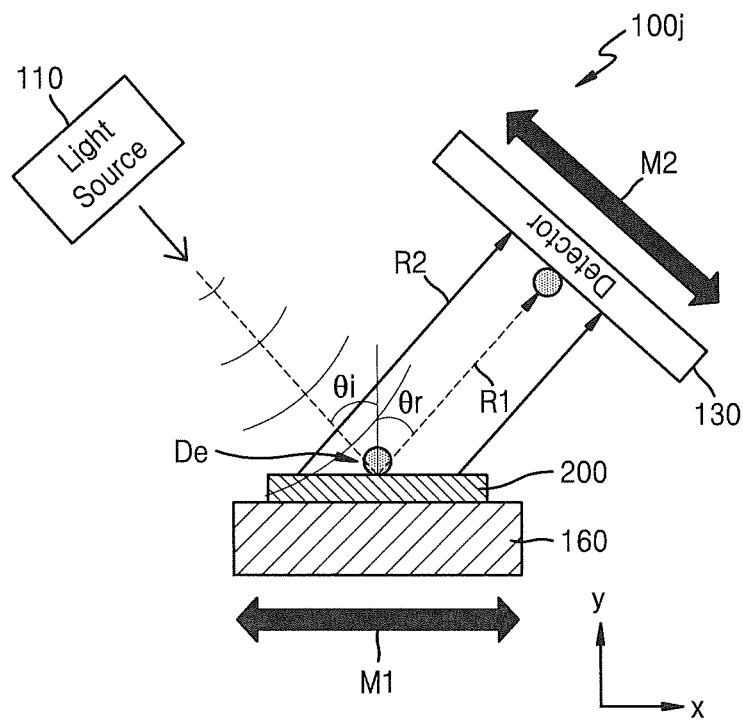

Referring to FIG. 11, the DHM 100j may be in a form obtained by combining the DHM 100h of FIG. 9A with the DHM 100b of FIG. 3A or the DHM 100c of FIG. 4A. Specifically, in the DHM 100j, light from a light source 110 may be directly incident on an inspection object 200, with a first incident angle θi, without using a beam splitter, the inspection object 200 may move in a first direction (i.e., the x direction) by a stage 160, or a detector 130 may move in a second direction (i.e., the y direction).

In the DHM 100j, the detector 130 may form a plurality of holograms by the movement of the inspection object 200 or the movement of the detector 130. A reconstruction unit 140 may generate a composite image of the inspection object 200 based on the plurality of holograms. Thus, the DHM 100j may improve the resolution of an image of the inspection object 200.

Figure 12:
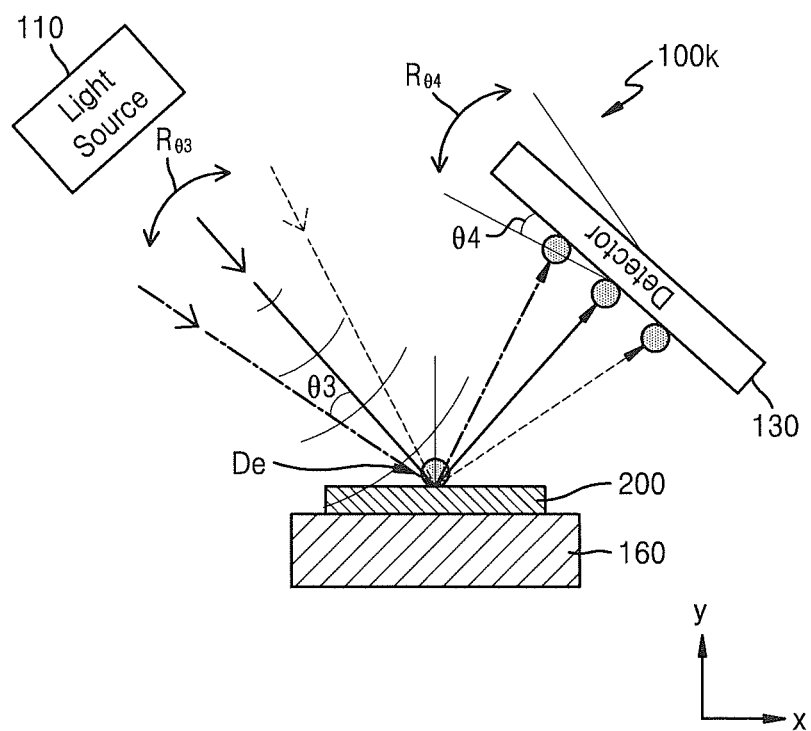

Referring to FIG. 12, the DHM 100k may be in a form obtained by combining the DHM 100h of FIG. 9A with the DHM 100e of FIG. 6A or the DHM 100f of FIG. 7. Specifically, in the DHM 100k, light from a light source 110 may be directly incident on an inspection object 200, with a first incident angle θi, without using a beam splitter, light from a light source 110 may be obliquely incident on the upper surface of the inspection object 200 while being changed in a third angle range $R_{\theta 3}$, or reflective light may be incident on a detector 130 while the detector 130 rotates in a fourth angle range $R_{\theta 4}$. The third angle range $R_{\theta 3}$ may be based on the first incident angle θi, and the maximum angle of the third angle range $R_{\theta 3}$ may have a third angle θ3 and may be less than or equal to 1°. The fourth angle range $R_{\theta 4}$ may be based on a pixel surface of the detector 130 before rotation, and the maximum angle of the fourth angle range $R_{\theta 4}$ may have a fourth angle θ4 and may be less than or equal to 1°.

In the DHM 100k, as light from the light source 110 is changed in the third angle range $R_{\theta 3}$ based on the first incident angle θi or the detector 130 rotates in a fourth angle range $R_{\theta 4}$, the detector 130 may form a plurality of holograms. A reconstruction unit 140 may generate a composite image of the inspection object 200 based on the plurality of holograms. Thus, the DHM 100k may improve the resolution of an image of the inspection object 200.

Although not shown in diagrams, a DHM in which the DHM 100i of FIG. 10 and the DHM 100j of FIG. 11 are combined with each other may also be realized. In such a DHM, a multi-wavelength light source may be used as a light source, a spectrometer may be further included, and an inspection object may be moved by a stage or a detector may be moved. Also, a DHM in which the DHM 100i of FIG. 10 and the DHM 100k of FIG. 12 are combined with each other may be realized. In such a DHM, a multi-wavelength light source may be used as a light source, a spectrometer may be further included, and light from a light source may be obliquely incident on an inspection object while being changed in the third angle range $R_{\theta3}$ or reflected light may be incident on a detector while the detector rotates in the fourth angle range $R_{\theta4}$.

In a DHM in which the DHM 100i of FIG. 10 and the DHM 100j of FIG. 11 are combined with each other, a plurality of first holograms according to wavelengths may be formed and a plurality of second holograms may be formed due to the movement of an inspection object or the movement of a detector. In a DHM in which the DHM 100i of FIG. 10 and the DHM 100k of FIG. 12, a plurality of first holograms corresponding to wavelengths may be formed and a plurality of third holograms may be formed as light from a light source is changed in the third angle range $R_{\theta3}$ or a detector rotates in the fourth angle range $R_{\theta4}$. Accordingly, a reconstruction unit may generate a composite image of an inspection object based on the plurality of first holograms and the plurality of second holograms, or the plurality of first holograms and the plurality of third holograms, thereby improving the resolution of an image of the inspection object.

Figure 13:
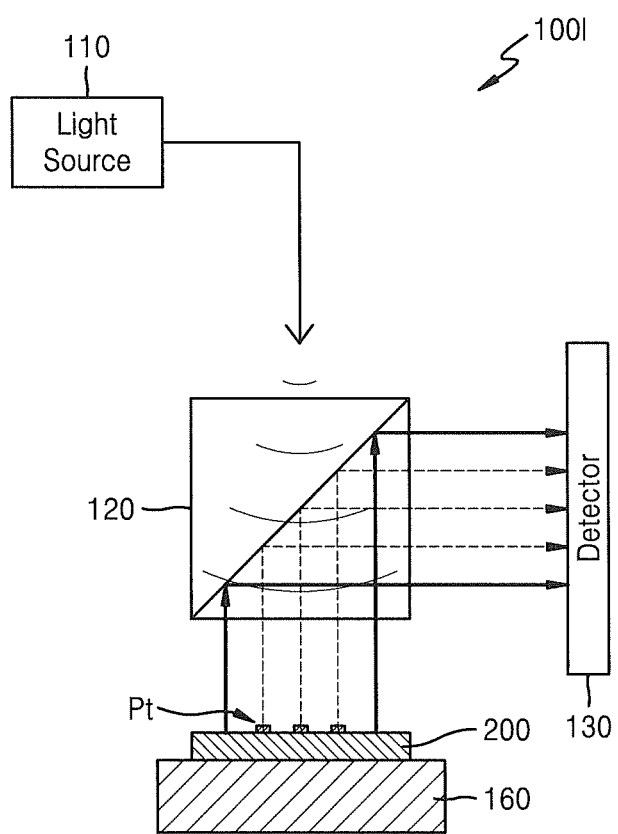

Referring to FIG. 13, the DHM 100l may be substantially the same as the DHM 100 of FIG. 1A. However, the DHM 100l may not detect a defect in an inspection object 200 but measure the structure of a pattern Pt formed on the inspection object 200. In addition, the DHM 100l may determine whether the inspection object 200 is defective by analyzing whether a measured structure of the pattern Pt matches a required structure.

The principle of measuring the structure of the pattern Pt may be substantially the same as the principle of finding a defect. For example, the detector 130 may generate a hologram based on interference between light diffracted and reflected at a portion of the inspection object 200 where a pattern is formed and light reflected at a portion of the inspection object 200 where a pattern is not formed, and a reconstruction unit (see the reconstruction unit 140 in FIG. 1A) may digitally reconstruct the hologram to generate an image of the inspection object 200, for example, an image of the pattern of the inspection object 200. Then, an analysis and determination unit (see the analysis and determination unit 150 in FIG. 1A) may compare an image of the structure of the pattern with a reference pattern structure to thereby determine whether the inspection object 200 is defective or not.

Although not shown in drawings, the DHMs 100a to 100k having various structures shown in FIGS. 3A to 12 may also be used for measuring the structure of the pattern Pt formed on the inspection object 200.

Figure 14:
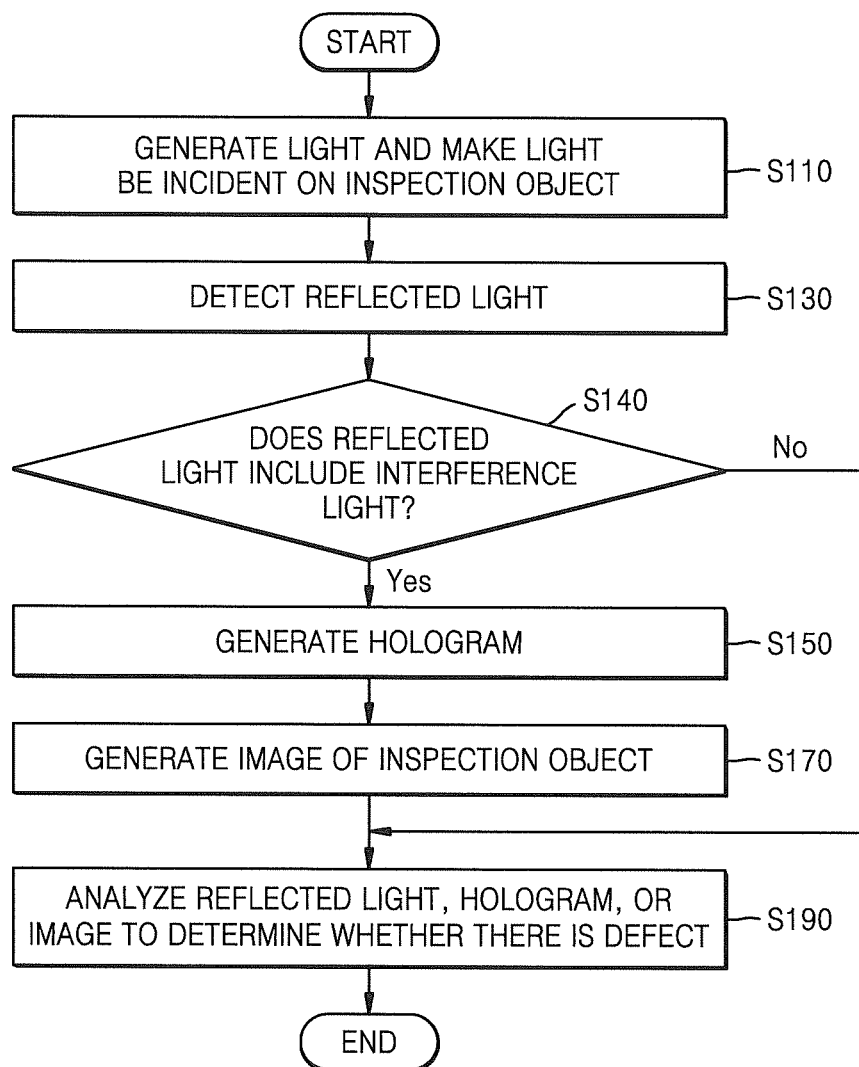
FIG. 14 is a flowchart of an inspection method using a DHM according to an embodiment of the inventive concept.

FIG. 14 is a flowchart of an inspection method using a DHM according to an embodiment of the inventive concept. The inspection method will be described with reference to FIGS. 1A to 13, and descriptions already given with reference to FIGS. 1A to 13 will be briefly described or omitted.

Referring to FIG. 14, first, light is generated by the light source 110 and is incident on the inspection object 200 (operation S110). The light generated by the light source 110 may be monochromatic light or multi-wavelength light. Various embodiments related to the incidence of light onto the inspection object 200 will be described in more detail with reference to FIGS. 15A to 15D.

Next, the detector 130 detects reflected light reflected from the inspection object 200 (operation S130). The reflected light may include diffracted and reflected light, that is, the first reflected light R1, and light reflected without diffraction, that is, the second reflected light R2. The reflected light may include only the second reflected light R2.

It is determined whether the reflected light includes interference light (operation S140). That is, it is determined whether the reflected light is interference light caused by an overlap between the first reflected light R1 and the second reflected light R2 or is the second reflected light R2. The interference light may be formed as the first reflected light R1 and the second reflected light R2 overlap each other in the beam splitter 120 or the detector 130.

If it is determined that the reflected light includes interference light (Yes), the detector 130 generates a hologram based on the interference light (operation S150). According to an embodiment of the inventive concept, the detector 130 may generate a plurality of holograms for each wavelength, for each position of the inspection object 200, for each position of the detector 130, for each angle of incidence of light onto the inspection object 200, or for each angle of incidence of reflected light onto the detector 130.

The reconstruction unit 140 generates an image of the inspection object 200 based on a hologram generated by the detector 130 (operation S170). When the detector 130 generates a plurality of holograms, the reconstruction unit 140 may generate a composite image of the inspection object 200 based on the plurality of holograms.

The analysis and determination unit 150 analyzes the reflected light, the hologram, or the image to determine whether there is a defect in the inspection object 200 (operation S190). More specifically, when the detector 130 generates a hologram, the reconstruction unit 140 may generate an image of the inspection object 200 based on the hologram. Accordingly, the analysis and determination unit 150 may analyze the image from the reconstruction unit 140 and determine whether there is a defect in the inspection object 200.

According to an embodiment of the inventive concept, the reconstruction unit 140 may be omitted, and operation S170 of generating an image of the inspection object may be omitted. In this case, the analysis and determination unit 150 may analyze the hologram generated by the detector 130 and determine whether there is a defect in the inspection object 200.

If it is determined that the reflected light does not include interference light (No), the analysis and determination unit 150 analyzes the reflected light incident on the detector 130 and determines whether there is a defect in the inspection object 200 (operation S190). For example, when no defect is present in the inspection object 200 and there is only the second reflected light R2, interference light may not be generated. Thus, the reflected light may not include interference light, and the detector 130 may not generate a hologram. In this manner, when the detector 130 may not generate a hologram, the analysis and determination unit 150 may directly analyze reflected light incident on the detector 130 to determine whether a defect is present in the inspection object 200.

According to an embodiment of the inventive concept, when the detector 130 may not generate a hologram, the reconstruction unit 140 may use an image generated by reflected light incident on the detector 130 as an image of the inspection object 200. In this case, the analysis and determination unit 150 may analyze the image of the inspection object 200 to determine whether a defect is present in the inspection object 200.

FIGS. 15A to 15D are flowcharts illustrating in more detail various embodiments of operation S110a of making light incident on an inspection object, in the inspection method of FIG. 14. The various embodiments will be described with reference to FIGS. 1A to 13 and FIGS. 15A to 15D. Descriptions already given with reference to FIGS. 1A to 14 will be briefly described or omitted.

Figure 15A:
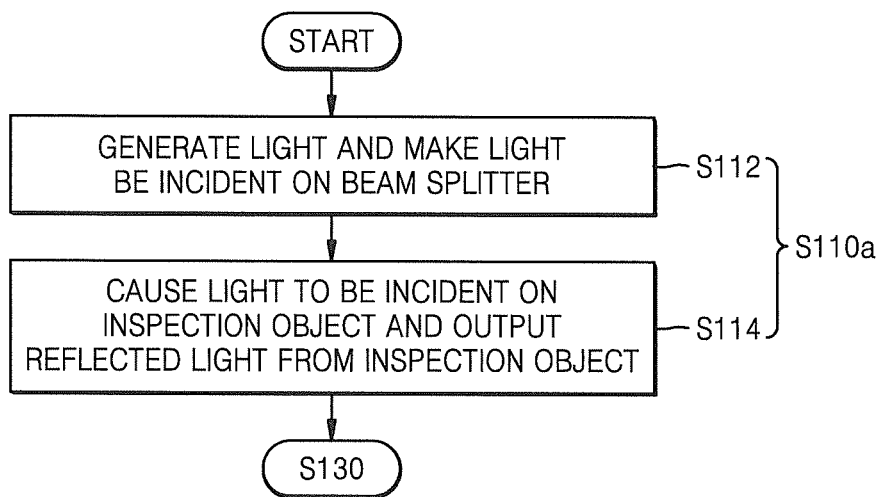
FIGS. 15A to 15D are flowcharts illustrating in more detail various embodiments of an operation of making light incident on an inspection object, in the inspection method of FIG. 14.

Referring to FIG. 15A, operation S110a of making light incident on an inspection object, according to an embodiment of the inventive concept, is as follows. First, light is generated by the light source 110 and is incident on the beam splitter 120 (operation S112). The light generated by the light source 110 may be monochromatic light.

The beam splitter 120 causes the light from the light source 110 to be incident on the inspection object 200 and outputs reflected light from the inspection object 200 (operation S114). The beam splitter 120 may transmit or reflect the light from the light source 110 to be incident on the inspection object 200 and may reflect or transmit reflected light from the inspection object 200 to be output. The reflected light output from the beam splitter 120 may be interference light due to an overlap between the first reflected light R1 and the second reflected light R2. The interference light output from the beam splitter 120 may be detected by the detector 130, and thus, a hologram may be generated by the detector 130.

Figure 15B:
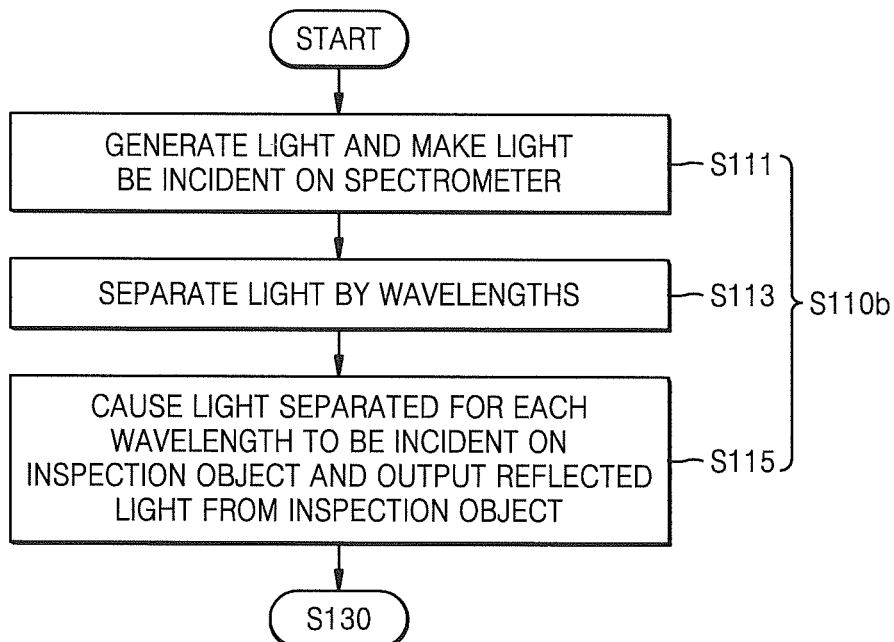

Referring to FIG. 15B, operation S110b of making light incident on an inspection object, according to an embodiment of the inventive concept, is as follows. First, light is generated by the light source 110a and is incident on the spectrometer 115 (operation S111). The light generated by the light source 110a may be multi-wavelength light.

The spectrometer 115 separates multi-wavelength light from the light source 110a by wavelengths (operation S113). Light separated for each wavelength may be output for each wavelength through the slit plate 117.

The light separated for each wavelength through the spectrometer 115 is incident on the inspection object 200, and reflected light is output from the inspection object 200 (operation S115). The reflected light from the inspection object 200 may be detected by the detector 130. In this case, by controlling the slit plate 117 and making light having a required wavelength incident on the inspection object 200, reflected light may be detected by the detector 130 for each wavelength. In addition, each of reflected lights according to wavelengths may be interference light caused by an overlap between the first reflected light R1 and the second reflected light R2. Accordingly, the detector 130 may generate a plurality of holograms corresponding to a plurality of interference lights.

Figure 15C:
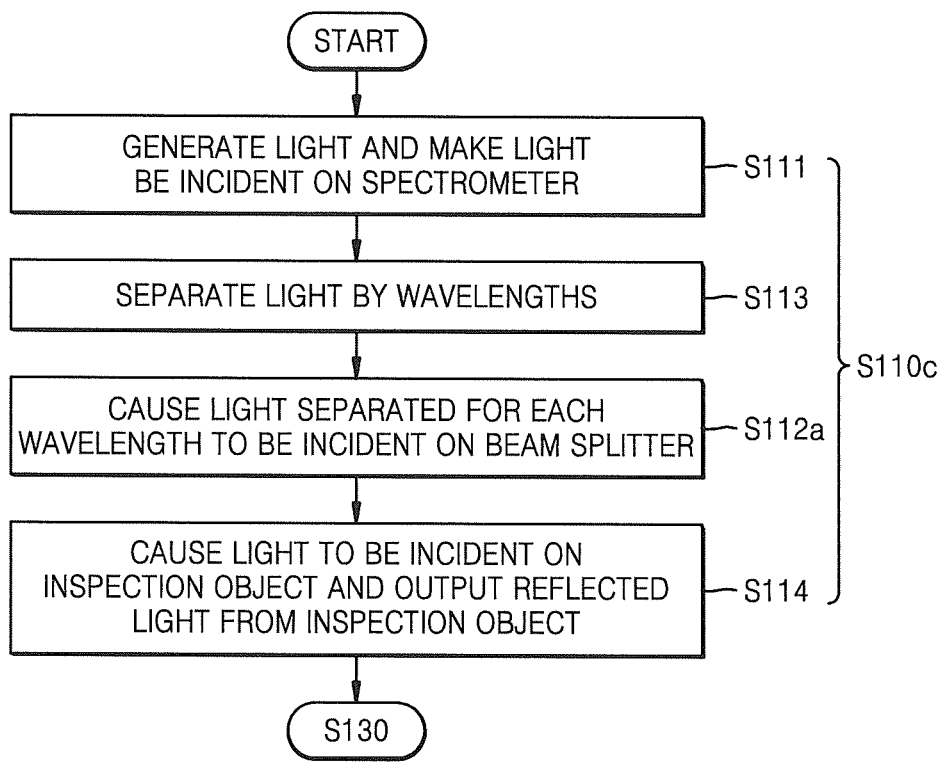

Referring to FIG. 15C, operation S110c of making light incident on an inspection object, according to an embodiment of the inventive concept, is as follows. First, light is generated by the light source 110a and is incident on the spectrometer 115 (operation S111). The light generated by the light source 110a may be multi-wavelength light.

The spectrometer 115 separates multi-wavelength light from the light source 110a by wavelengths (operation S113). Light separated for each wavelength may be output for each wavelength through the slit plate 117.

The light separated for each wavelength by the spectrometer 115 is incident on the beam splitter 120 (operation S112a).

The beam splitter 120 causes the light separated for each wavelength to be incident on the inspection object 200 and outputs reflected light from the inspection object 200 (operation S114). The beam splitter 120 may transmit or reflect the light separated for each wavelength to be incident on the inspection object 200 and may reflect or transmit reflected light from the inspection object 200 to be output.

By controlling the slit plate 117 and making light having a required wavelength incident on the beam splitter 120 to make the light incident on the inspection object 200, reflected light may be output from the beam splitter 120 for each wavelength. Each of reflected lights output from the beam splitter 120 may be interference light caused by an overlap between the first reflected light R1 and the second reflected light R2. Accordingly, the detector 130 may generate a plurality of holograms corresponding to the plurality of interference lights.

Figure 15D:
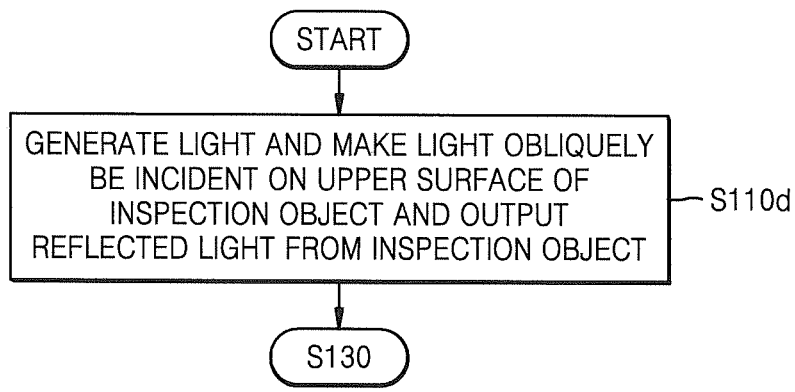

Referring to FIG. 15D, light is generated by the light source 110 and is obliquely incident on the upper surface of the inspection object 200, and reflected light is output from the inspection object 200 (operation S110d). The output reflected light may be interference light due to an overlap between the first reflected light R1 and the second reflected light R2 and may be detected by the detector 130. Thus, the detector 130 may generate a hologram corresponding to the interference light.

Figure 16:
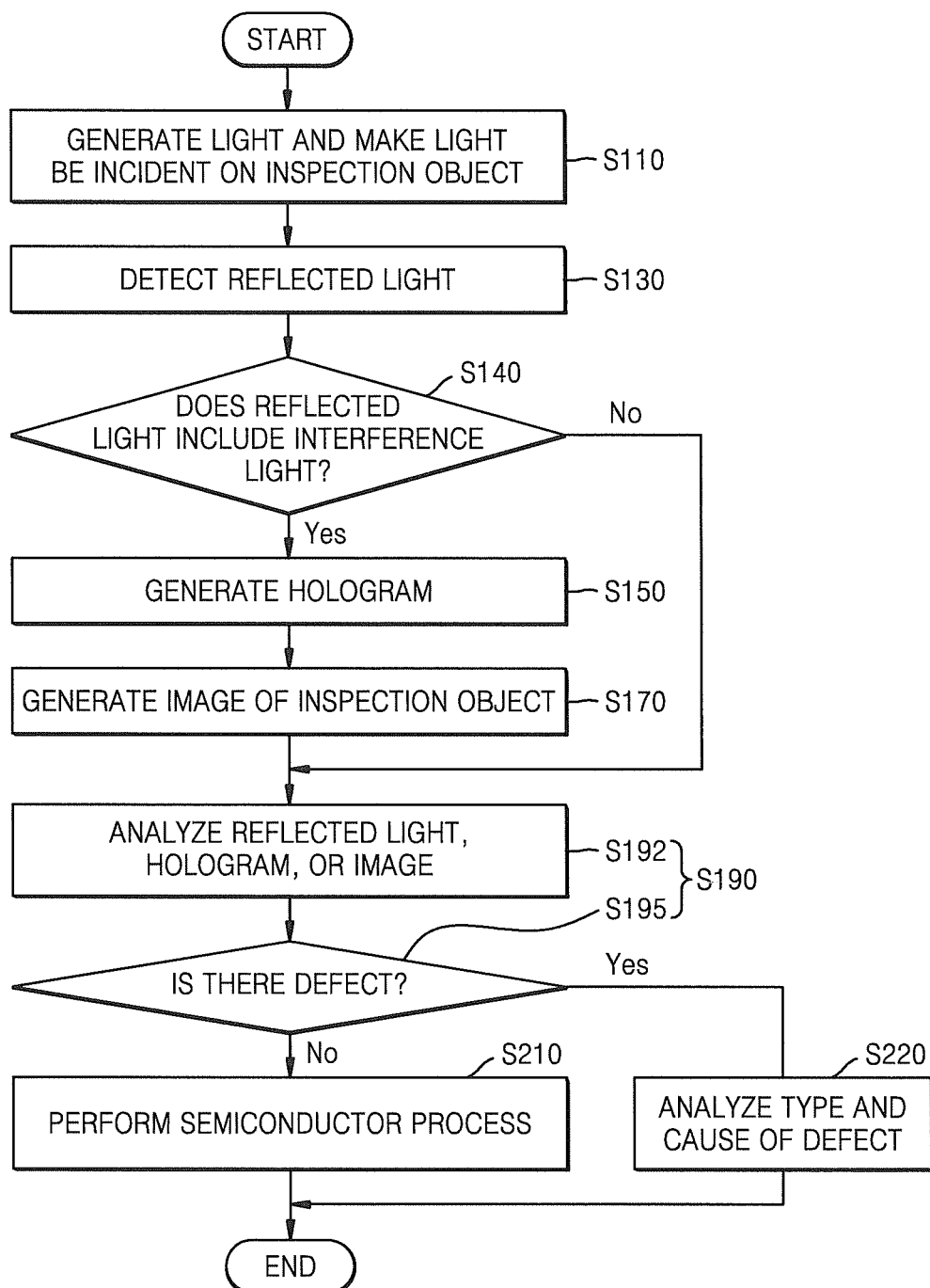
FIG. 16 is a flowchart of a method of manufacturing a semiconductor device by using a DHM, according to an embodiment of the inventive concept.

FIG. 16 is a flowchart of a method of manufacturing a semiconductor device by using a DHM, according to an embodiment of the inventive concept. The method will be described with reference to FIGS. 1A to 13 and FIG. 16. Descriptions already given with reference to FIGS. 1A to 15d will be briefly described or omitted.

Referring to FIG. 16, operation S110 of generating light and making the light incident on the inspection object 200 to operation S190 of analyzing reflected light, a hologram, or an image and determining whether a defect is present are performed. Descriptions of operations S110 to S190 in FIG. 16 are as described above with reference to FIGS. 14 to 15D.

Operation S190 may include operation S192 of analyzing reflected light, a hologram, or an image and operation S195 of determining whether a defect is present.

If it is determined, in operation S195, that no defect is present (No), a semiconductor process is performed on the inspection object 200 (operation S210). For example, when the inspection object 200 is a wafer, a semiconductor process may be performed on the wafer. The semiconductor process for the wafer may include various processes. For example, the semiconductor process for the wafer may include a deposition process, an etching process, an ion implantation process, a cleaning process, and the like. Integrated circuits and wirings required for the semiconductor device may be faulted by performing the semiconductor process for the wafer. The semiconductor process for the wafer may include a process of testing the semiconductor device at a wafer level.

When semiconductor chips in the wafer are completed through the semiconductor process for the wafer, the wafer may be divided into the semiconductor chips. Divisions into the semiconductor chips may be achieved through a sawing process by a blade or a laser. Thereafter, a packaging process may be performed on the semiconductor chips. The packaging process may refer to a process in which the semiconductor chips are mounted on a printed circuit board (PCB) and sealed with a sealing material. The packaging process may include stacking a plurality of semiconductor chips on a PCB to form a stack package, or stacking a stack package on another stack package to form a package on package (POP) structure. A semiconductor device or a semiconductor package may be completed through a packaging process for a semiconductor chip. A test process may be performed on the semiconductor package after the packaging process.

If it is determined, in operation S195, that a defect is present (Yes), the type and cause of the defect are analyzed (operation S220). According to an embodiment of the inventive concept, a process of removing the defect through cleaning or the like or of discarding the inspection object 200 may be performed depending on the type of the defect.

While the inventive concept has been particularly shown and described with reference to embodiments thereof, it will be understood that various changes in form and details may be made therein without departing from the spirit and scope of the following claims.

What is claimed is:

1. An inspection method using a digital holography microscope (DHM) comprising a light source and a detector, the inspection method comprising:
   generating light and making the light incident on an inspection object;
   detecting reflected light from the inspection object;
   analyzing the reflected light to determine whether a defect is present in the inspection object; and
   generating a hologram and analyzing the hologram when the reflected light comprises interference light,
   wherein the DHM has a lens-free path from the light source to the detector.

2. The inspection method of claim 1, wherein light diffracted and reflected at a portion of the inspection object where a defect is present and light reflected at a portion of the inspection object where no defect is present overlap each other, thus generating interference fight when a defect is present in the inspection object.

3. The inspection object of claim 1, wherein making the light incident on the inspection object comprises:
   generating the light and making the light incident on a beam splitter, and
   making the light incident on the inspection object and outputting the reflected light from the inspection object by the beam splitter.

4. The inspection method of claim 1, wherein, in making the light incident on the inspection object, the light is incident on an upper surface of the inspection object at a set inclination angle, and
   wherein the detector is arranged to detect the reflected light.

5. The inspection method of claim 1, wherein the light source comprises a multi-wavelength light source,
   wherein making the light incident on the inspection object comprises:
   generating light having a plurality of wavelengths and making the light incident on a spectrometer;
   separating, by the spectrometer, the light by wavelengths; and
   causing the light separated for each wavelength to be incident on the inspection object,
   wherein a hologram is generated for each wavelength in detecting the reflected light.

6. The inspection method of claim 1, further comprising:
   reconstructing the hologram digitally to generate an image of the inspection object after detecting the reflected light; and
   analyzing the image of the inspection object.

7. The inspection method of claim 6, further comprising:
   generating a composite image of the inspection object based on a plurality of holograms; and
   analyzing the composite image,
   wherein the plurality of holograms are generated depending on light wavelength, a position of the inspection object, a position of the detector, an angle of incidence of light onto the inspection object, or an angle of incidence of reflected light onto the detector in detecting the reflected light.

8. A method of manufacturing a semiconductor device by using a digital holography microscope (DHM) comprising a light source and a detector, the method comprising:
   generating light and making the light incident on an inspection object;
   detecting reflected light from the inspection object;
   analyzing the reflected light to determine whether a defect is present in the inspection object;
   generating a hologram and analyzing the hologram when the reflected light comprises interference light; and
   performing a semiconductor process on the inspection object when no defect is present in the inspection object,
   wherein the DHM has a lens-free path from the light source to the detector.

9. The method of claim 8, wherein making the light incident on the inspection object comprises:
   generating the light and making the light incident on a beam splitter, and
   making the light incident on the inspection object with the beam splitter, and outputting the reflected light from the inspection object.

10. The method of claim 8, wherein, in making the light incident on the inspection object, the light is incident on an upper surface of the inspection object at a set inclination angle, and
   wherein the detector is arranged to detect the reflected light.

11. The method of claim 8, further comprising:
   reconstructing the hologram digitally to generate an image of the inspection object after detecting the reflected light; and
   generating a composite image of the inspection object based on a plurality of holograms and analyzing the image or the composite image,
   wherein the plurality of holograms are generated depending on light wavelength, a position of the inspection object, a position of the detector, an angle of incidence of the light onto the inspection object, or an angle of incidence of the reflected light onto the detector in detecting the reflected light.

* * * * *